US011897055B2

(12) United States Patent
Matsushita et al.

(10) Patent No.: US 11,897,055 B2
(45) Date of Patent: Feb. 13, 2024

(54) BALANCE ADJUSTMENT METHOD FOR ROTOR AND TURBOCHARGER

(71) Applicant: MITSUBISHI HEAVY INDUSTRIES ENGINE & TURBOCHARGER, LTD., Sagamihara (JP)

(72) Inventors: Kazuki Matsushita, Sagamihara (JP); Hideyuki Kumagai, Sagamihara (JP); Hiroyuki Kadono, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 44 days.

(21) Appl. No.: 17/762,531

(22) PCT Filed: Nov. 12, 2019

(86) PCT No.: PCT/JP2019/044300
§ 371 (c)(1),
(2) Date: Mar. 22, 2022

(87) PCT Pub. No.: WO2021/095118
PCT Pub. Date: May 20, 2021

(65) Prior Publication Data
US 2022/0339738 A1 Oct. 27, 2022

(51) Int. Cl.
*B23K 26/36* (2014.01)
*B23K 26/082* (2014.01)
*F01D 5/02* (2006.01)

(52) U.S. Cl.
CPC ............ *B23K 26/36* (2013.01); *B23K 26/082* (2015.10); *F01D 5/027* (2013.01); *F05D 2220/40* (2013.01)

(58) Field of Classification Search
CPC .................. B23K 26/36; B23K 26/082; B23K 2101/001; B23K 2103/08; B23K 26/03;
(Continued)

(56) References Cited

U.S. PATENT DOCUMENTS

2016/0305843 A1* 10/2016 Nomura .................. G01M 1/34
2017/0009585 A1* 1/2017 Maeda .................... F01D 5/027

FOREIGN PATENT DOCUMENTS

CN 106052960 A 10/2016
JP 2003-129135 A 5/2003
(Continued)

OTHER PUBLICATIONS

International Preliminary Report on Patentability and Written Opinion of the International Searching Authority for International Application No. PCT/JP2019/044300, dated May 27, 2022, with English translation.
(Continued)

*Primary Examiner* — Jacob M Amick
*Assistant Examiner* — Charles J Brauch
(74) *Attorney, Agent, or Firm* — Birch, Stewart, Kolasch & Birch, LLP

(57) ABSTRACT

A balance adjustment method for a rotor includes an imbalance acquisition step of acquiring imbalance position and amount of the rotor after a first balance correction step of correcting balance of the rotor by cutting a compressor wheel side, an excision target section determination step of determining, based on the imbalance position and amount of the rotor, an excision target range including an imbalance correction position of the turbine wheel and a removal amount in the excision target range, and a second balance correction step of correcting the balance of the rotor by repeatedly irradiating the excision target range determined in the excision target section determination step with laser light from a laser marker device to remove by the removal amount from the turbine wheel.

20 Claims, 12 Drawing Sheets

(58) Field of Classification Search
CPC ........ F01D 5/027; F01D 21/003; F01D 25/04; F01D 5/10; F05D 2220/40; F05D 2260/96; Y02T 10/12; G01M 1/225; G01M 1/34

See application file for complete search history.

(56) References Cited

FOREIGN PATENT DOCUMENTS

| | | | |
|---|---|---|---|
| JP | 2011-112514 A | 6/2011 |
| JP | 2016-200567 A | 12/2016 |
| JP | 2017-15639 A | 1/2017 |
| JP | 2018-140407 A | 9/2018 |

OTHER PUBLICATIONS

International Search Report for International Application No. PCT/JP2019/044300, dated Jan. 7, 2020.

* cited by examiner

FIG. 14

| UNIT REMOVAL AMOUNT UR | UNIT EXCISION INFO UE | SCAN SPEED SS | IRRADIATION FREQUENCY TI | UNIT REMOVAL PERIOD UT | CYCLE TIME CT |
|---|---|---|---|---|---|
| UR1 | UE1 | SS1(<LSS) LOW | TI1 LOW | UT1(<LUT) SHORT | CT1(<LCT) SHORT |
| | UE2 | SS2 | TI2 | UT2 | CT2 |
| | UE3 | SS3 | TI3 | UT3 | CT3 |
| | UE4 | SS4 | TI4 | UT4 | CT4 |
| | UE5 | SS5(>USS) HIGH | TI5 HIGH | UT5(>UUT) LONG | CT5(>LCT) LONG |

RT

BALANCE ADJUSTMENT METHOD FOR ROTOR AND TURBOCHARGER

TECHNICAL FIELD

The present disclosure relates to a balance adjustment method for a rotor in which a turbine wheel and a compressor wheel are connected via a rotational shaft, and a turbocharger including the above-described rotor.

BACKGROUND

A turbocharger uses energy of an exhaust gas discharged from an internal combustion engine (such as an engine) to supercharge a gas (such as air) sent to the internal combustion engine, thereby improving an output of the internal combustion engine and improving fuel efficiency.

The turbocharger may include a rotor in which a turbine wheel and a compressor wheel are mechanically connected via a rotational shaft, and a housing for rotatably housing the above-described rotor. Further, the above-described housing may include a bearing housing for housing a bearing for rotatably supporting the rotational shaft, a turbine housing for housing a turbine wheel, and a compressor housing for housing a compressor wheel.

If imbalance (an unbalanced weight with respect to a rotation axis of the rotor) is caused in the above-described rotor, the turbocharger may cause a vibration due to a centrifugal force generated by imbalance during a rotation of the rotor, and may make noise caused by the above-described vibration.

Conventionally, as a method for adjusting balance during the rotation of the turbocharger, double-plane correction is known which removes imbalance by cutting, with an end mill, a grindstone, or the like, the compressor wheel and a nut connecting the compressor wheel to the rotational shaft in a cartridge of the turbocharger. The above-described cartridge is obtained by mounting the above-described bearing and the above-described bearing housing on the above-described rotor. Performing double-plane correction on the cartridge also removes imbalance which is caused when individual components forming the cartridge are assembled.

CITATION LIST

Patent Literature

Patent Document 1: JP2011-112514A

SUMMARY

Technical Problem

With the above-described double-plane correction, it is possible to significantly reduce imbalance of the cartridge. However, in case where imbalance remains in the cartridge even if the above-described double-plane correction is performed and the vibration acceleration (G value) increases, further balance adjustment is required. It is conceivable to reduce the vibration acceleration (G value) by performing balance correction on the turbine wheel of the cartridge. However, since the turbine wheel is generally made of a difficult-to-cut material such as a nickel-based superalloy, there is a problem that removal processing with accuracy required for fine adjustment of balance after the above-described double-plane correction is difficult in the above-described cutting.

Patent Document 1 discloses that balance correction for a rotor is performed by, in a state where the rotor is rotated, irradiating an imbalance correction position of the rotor with laser light in the axial direction of the rotor, and removing the mass of the above-described imbalance correction position. However, a laser processing machine for metal processing that cuts or shears a metal material by laser light irradiation is expensive, which may lead to an increase in equipment cost. Further, as a result of intensive researches, the present inventors have found that since the above-described laser processing machine for metal processing has a large laser light output, the removal processing with accuracy required for fine adjustment of balance after the above-described double-plane correction is difficult.

In view of the above issues, an object of at least one embodiment of the present disclosure is to provide a balance adjustment method for the rotor capable of suppressing the increase in equipment cost, as well as capable of improving accuracy in balance adjustment of the rotor.

Solution to Problem

A balance adjustment method for a rotor according to the present disclosure is a balance adjustment method for a rotor, in which a turbine wheel and a compressor wheel are connected via a rotational shaft, that includes an imbalance acquisition step of acquiring imbalance position and amount of the above-described rotor after a first balance correction step of correcting balance of the above-described rotor by cutting at least one of the above-described compressor wheel and a nut member connecting the above-described compressor wheel to the above-described rotational shaft, an excision target section determination step of determining, based on the imbalance position and amount of the above-described rotor acquired in the above-described imbalance acquisition step, an excision target range including an imbalance correction position of the above-described turbine wheel and a removal amount in the above-described excision target range, and a second balance correction step of correcting the balance of the above-described rotor by repeatedly irradiating the above-described excision target range determined in the above-described excision target section determination step with laser light from a laser marker device to remove by the above-described removal amount from the above-described turbine wheel.

A turbocharger according to the present disclosure is a turbocharger including a rotor in which a turbine wheel and a compressor wheel are connected via a rotational shaft. The above-described turbine wheel has a laser mark engraved on a peripheral surface of a boss portion by a laser marker device.

Advantageous Effects

According to at least one embodiment of the present disclosure, a balance adjustment method for a rotor is provided, which is capable of suppressing an increase in equipment cost, as well as capable of improving accuracy in balance adjustment of the rotor.

BRIEF DESCRIPTION OF DRAWINGS

FIG. 14 is an explanatory table for describing an example of the unit excision information and unit excision period information in an embodiment.

DETAILED DESCRIPTION

Figure 1:
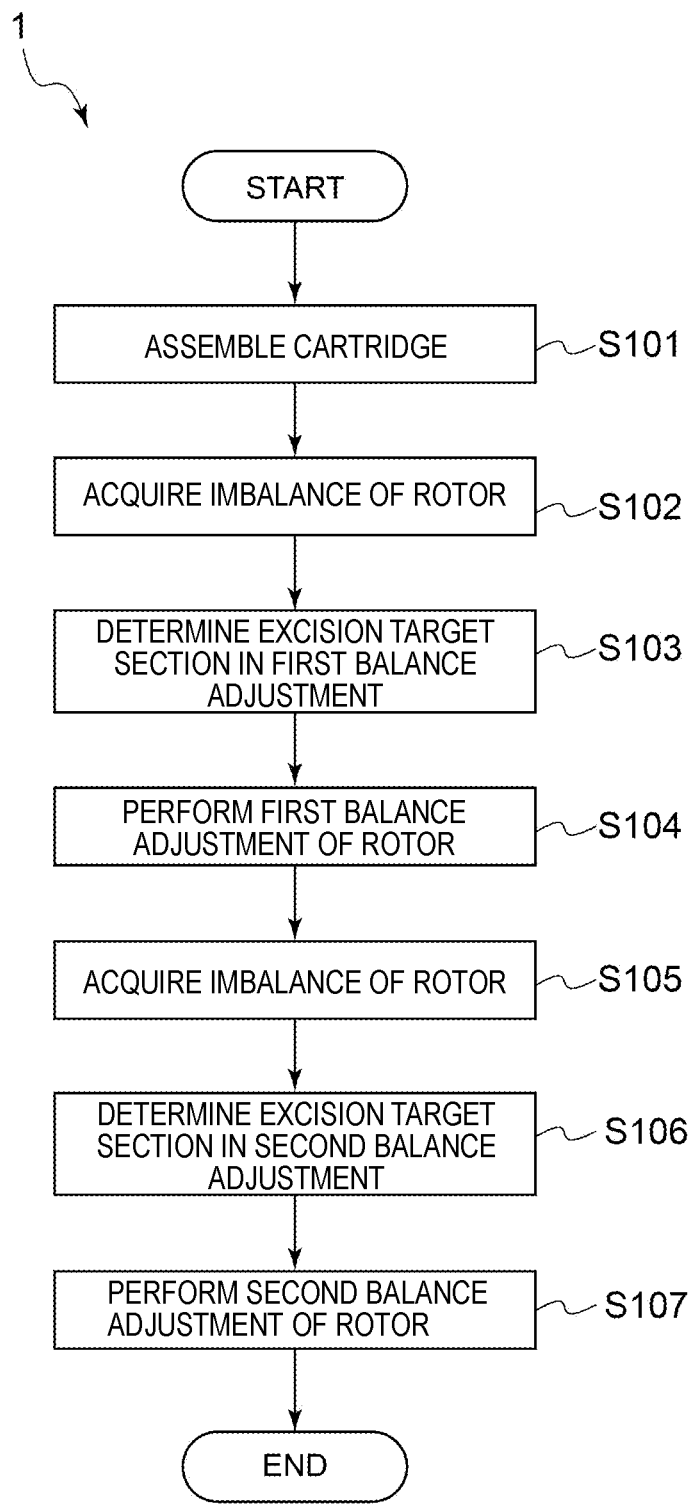
FIG. 1 is a flowchart of a balance adjustment method for a rotor according to an embodiment.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including" or "having" one constitutional element is not an exclusive expression that excludes the presence of other constitutional elements.

The same configurations are indicated by the same reference characters and may not be described again in detail.

Figure 2:
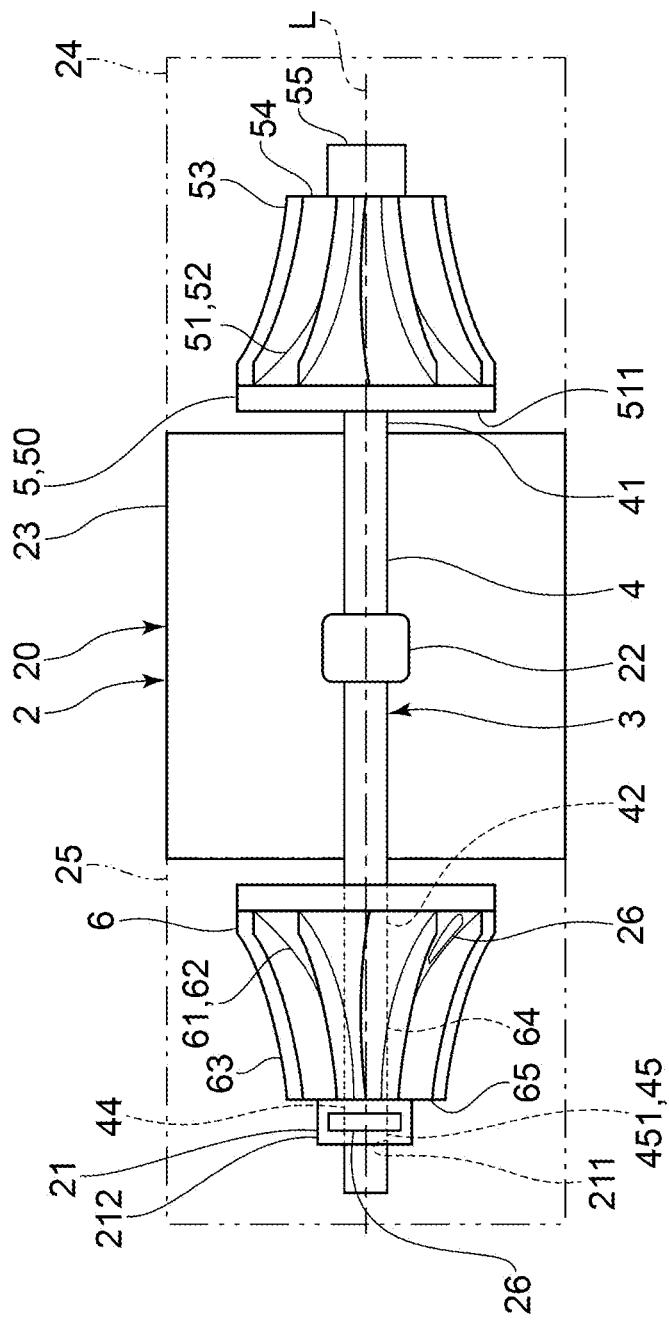
FIG. 2 is a schematic configuration view schematically showing the configuration of a cartridge of a turbocharger in an embodiment.
Figure 3:
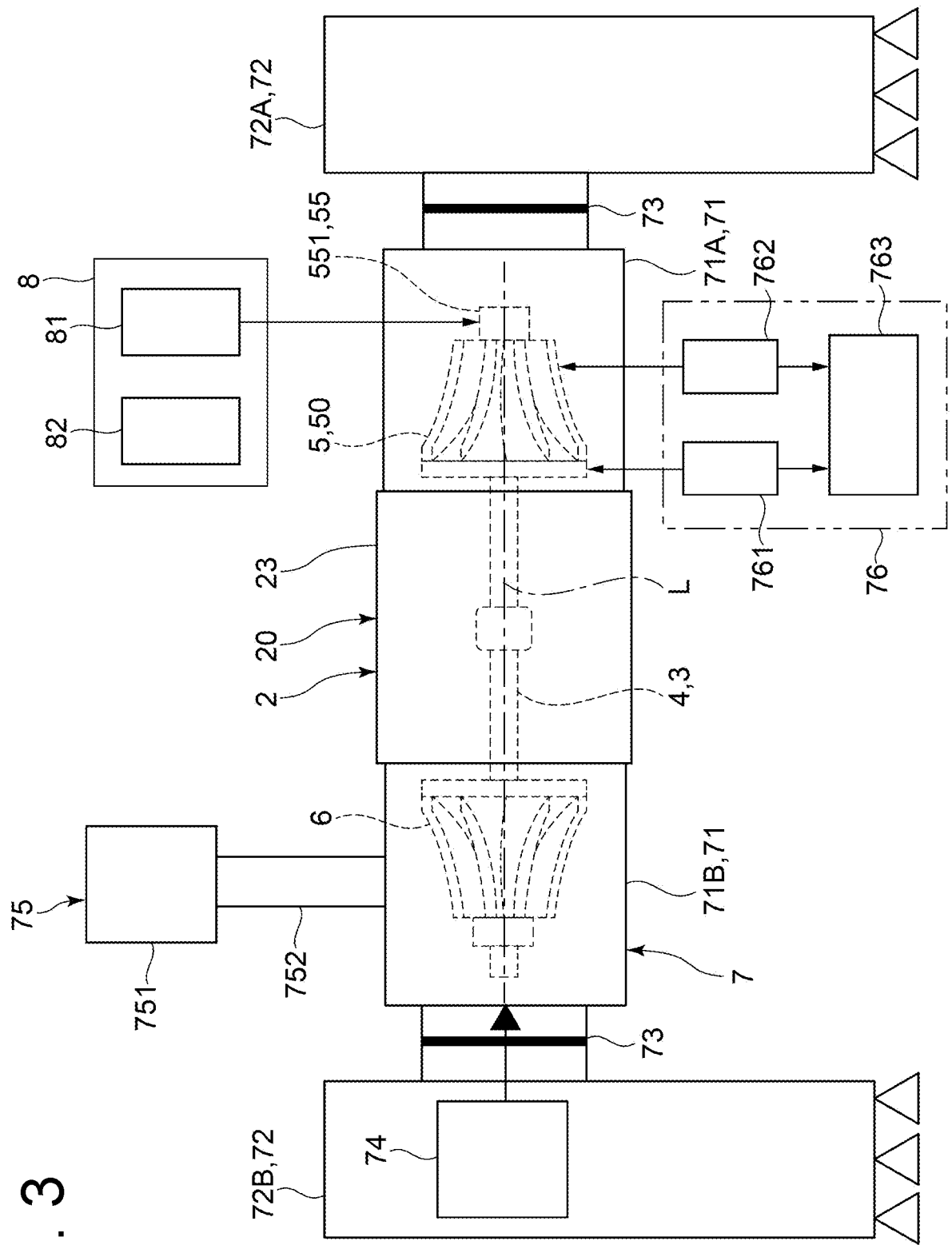
FIG. 3 is a schematic configuration view schematically showing the configuration of an imbalance detection device and a laser marker device used for the balance adjustment method for the rotor according to an embodiment.

FIG. 1 is a flowchart of a balance adjustment method for a rotor according to an embodiment. FIG. 2 is a schematic configuration view schematically showing the configuration of a cartridge of a turbocharger in an embodiment. FIG. 3 is a schematic configuration view schematically showing the configuration of an imbalance detection device and a laser marker device used for the balance adjustment method for the rotor according to an embodiment.

A balance adjustment method 1 for the rotor according to some embodiments is a method for adjusting balance of a rotor 3 in which a turbine wheel 5 and a compressor wheel 6 are mechanically connected via a rotational shaft 4 as shown in FIG. 2. In the balance adjustment method 1 for the rotor described above, balance adjustment of the rotor 3 is performed in a state where the components are assembled in a cartridge 20 of a turbocharger 2 as shown in FIG. 2.

(Rotor, Turbocharger)

As shown in FIG. 2, the rotor 3 includes the rotational shaft 4 having a longitudinal direction along an axis L of the rotational shaft 4, the turbine wheel 5 mechanically connected to one end portion 41 of the rotational shaft 4 in the longitudinal direction, and the compressor wheel 6 mechanically connected to another end portion 42 of the rotational shaft 4 in the longitudinal direction.

As shown in FIG. 2, the turbine wheel 5 includes a hub 51 extending along the axial direction along the axis L of the rotational shaft 4, a plurality of blades 53 disposed on an outer peripheral surface 52 of the hub 51, and a boss portion 55 disposed coaxially with the hub 51 and protruding from one end portion 54 of the hub 51 in the above-described axial direction.

In the illustrated embodiment, the turbine wheel 5 is fixed to the rotational shaft 4 by causing a central portion of a back surface 511 of the hub 51 to abut on the one end portion 41 of the rotational shaft 4, and joining a periphery of the abutting portion by welding. The rotational shaft 4 and the turbine wheel 5 joined by welding are collectively called a turbine rotor 50. The method of connecting the rotational shaft 4 and the turbine wheel 5 is not limited to joining by welding.

As shown in FIG. 2, the compressor wheel 6 includes a hub 61 extending along the axial direction along the axis L of the rotational shaft 4, and a plurality of blades 63 disposed on an outer peripheral surface 62 of the hub 61.

In the illustrated embodiment, the compressor wheel 6 is fixed to the rotational shaft 4 by screw fastening. In the compressor wheel 6, a through hole 64 is formed which penetrates the hub 61 in the axial direction along the above-described axis L. In the compressor wheel 6, the another end portion 42 of the rotational shaft 4 is inserted through the through hole 64, and a protruding portion 44 of the rotational shaft 4 protrudes from a leading edge end 65 of the hub 61. The compressor wheel 6 is fixed to the rotational shaft 4 by screwing a female thread portion 211 of a nut member 21 into a male thread portion 451 formed on the outer peripheral surface 45 in the protruding portion 44 of the rotational shaft 4.

That is, the nut member 21 mechanically connects the compressor wheel 6 to the rotational shaft 4. The method of connecting the rotational shaft 4 and the compressor wheel 6 is not limited to screw fastening.

As shown in FIG. 2, the cartridge 20 of the turbocharger 2 includes the above-described rotor 3, a bearing 22 for rotatably supporting the rotational shaft 4 of the rotor 3, and a bearing housing 23 for housing the bearing 22. As shown in FIG. 2, the turbocharger 2 includes the cartridge 20, a turbine housing 24 configured to house the turbine wheel 5, and a compressor housing 25 configured to house the compressor wheel 6. Each of the turbine housing 24 and the compressor housing 25 is assembled to the cartridge 20 after balance adjustment of the rotor 3 is completed, and is thus indicated by a double-dotted chain line in the drawing. Each of the turbine housing 24 and the compressor housing 25 is mechanically connected to the bearing housing 23 by a fastening member such as a fastening bolt or a V clamp.

(Balance Adjustment Method for Rotor)

As shown in FIG. 1, the balance adjustment method 1 for the rotor according to some embodiments includes a cartridge assembly step S101, a first imbalance acquisition step S102, a first excision target section determination step S103, a first balance correction step S104, a second imbalance acquisition step S105 (imbalance acquisition step), a second excision target section determination step S106 (excision target section determination step), and a second balance correction step S107.

The cartridge assembly step S101 includes assembling the cartridge 20 by assembling individual components forming the cartridge 20. Before the cartridge assembly step S101, balance adjustment may be performed on each of the components (such as the turbine rotor 50 and the compressor wheel 6) forming the cartridge 20 during a rotation of the single component.

The first imbalance acquisition step S102 includes acquiring imbalance position and amount (mass) of the rotor 3 of the cartridge 20, after the cartridge assembly step S101. More specifically, as shown in FIG. 3, in the cartridge 20, the rotor 3 is rotatably supported by an imbalance detection device 7 in the first imbalance acquisition step S102.

In the illustrated embodiment, as shown in FIG. 3, the imbalance detection device 7 includes two housing members 71 (a turbine-side housing member 71A and a compressor-side housing member 71B), and two support mechanisms 72 (a turbine-side support mechanism 72A and a compressor-side support mechanism 72B). The imbalance detection device 7 supports the cartridge 20 by sandwiching the bearing housing 23 of the cartridge 20 with the turbine-side housing member 71A for internally housing the turbine wheel 5 and the compressor-side housing member 71B for internally housing the compressor wheel 6 from both sides in the axial direction along the above-described axis L, and pressing at least one of the two housing members 71 toward the other by the two support mechanisms 72. The turbine-side support mechanism 72A is connected to the turbine-side housing member 71A, and the compressor-side support mechanism 72B is connected to the compressor-side housing member 71B. Each of the two support mechanisms 72 is fixed to a floor of a factory or the like so as not to move when the cartridge 20 is pressed, and also connected to a corresponding one of the housing members 71 via a vibration isolation member 73 (for example, an elastic member such as rubber).

In the embodiment shown in FIG. 3, a pressing device 74 provided for the compressor-side support mechanism 72B is configured to press the compressor-side housing member 71B toward the cartridge 20. As the pressing device 74, for example, a piston device can be given which is configured to be able to expand and contract a piston rod by receiving an air pressure or a hydraulic pressure.

As shown in FIG. 3, the imbalance detection device 7 includes a rotating device 75 configured to rotate the rotor 3 by supplying a gas (such as air) to either the turbine wheel 5 or the compressor wheel 6, and a detection device 76 for detecting imbalance from the rotating rotor 3.

In the illustrated embodiment, the rotating device 75 includes a blower 751 configured to send the gas, and an air supply pipe 752 connected at one end portion to the blower 751 and connected at another end portion to the compressor-side housing member 71B, and is configured to supply air from the blower 751 to the compressor wheel 6 housed in the compressor-side housing member 71B via the air supply pipe 752. As the compressor wheel 6 rotates, the rotational shaft 4 and the turbine wheel 5 rotate. In some other embodiments, the rotor 3 may be configured to rotate by connecting the another end portion of the air supply pipe 752 to the turbine-side housing member 71A to supply the air from the blower 751 to the turbine wheel 5.

In the illustrated embodiment, the detection device 76 includes an acceleration sensor (vibration sensor) 761 for acquiring a vibration of the rotor 3, a rotation angle sensor 762 for acquiring a phase of the rotor 3, and a computing device (such as a computer) 763 configured to calculate the imbalance position and amount (mass) of the rotor 3 from a vibration signal acquired by the acceleration sensor 761 and the phase of the rotor 3 acquired by the rotation angle sensor 762. The first imbalance acquisition step S102 includes acquiring, by the acceleration sensor 761, the vibration during rotation caused by the imbalance of the rotating rotor 3 from the rotor 3. At the same time as acquisition of the vibration by the acceleration sensor 761, the phase of the rotor 3 is acquired by the rotation angle sensor 762. Based on a relationship between the vibration signal acquired by the acceleration sensor 761 and the phase of the rotor 3 acquired by the rotation angle sensor 762, the computing device 763 calculates the imbalance position and amount (mass) of the rotor 3 causing the vibration. It is only necessary that the detection device 76 is configured to be able to acquire the imbalance position and amount (mass) from the rotor 3, and the present disclosure is not limited to the illustrated configuration.

The first excision target section determination step S103 includes determining, based on the imbalance position and amount of the rotor 3 acquired in the first imbalance acquisition step S102, a position (imbalance correction position) and an excision amount which are optimal for balancing of the rotor 3 in at least one of the compressor wheel 6 and the nut member 21.

In a certain embodiment, at least one piece of first relationship information (such as an effect vector), which indicates a relationship between a mass (unit weight) cut from either the compressor wheel 6 or the nut member 21 of the rotor 3 and a change in magnitude of a vibration due to the above-described cutting of the mass, is acquired in advance through an experiment using the cartridge 20 of the same model number (product). If a target to be excised from the rotor 3 is different, the above-described first relationship information is also different, making it necessary to acquire the above-described first relationship information for each of the compressor wheel 6 and the nut member 21. Then, based on the imbalance position and amount (initial imbalance) of the rotor 3 acquired in the first imbalance acquisition step S102, as well as the first relationship information, first deletion information is calculated which includes the position (imbalance correction position) and the excision amount which are optimal for balancing of the rotor 3.

The first balance correction step S104 includes correcting the balance of the rotor 3 by cutting at least one of the compressor wheel 6 and the nut member 21 connecting the compressor wheel 6 to the rotational shaft 4 in the above-described cartridge 20.

In a certain embodiment, the compressor wheel 6 or the nut member 21 is cut based on the imbalance correction position and the excision amount (excision information) determined in the first excision target section determination step S103. The first balance correction step S104 includes cutting, for example, an outer surface 212 of the nut member 21 or an outer peripheral surface 62 of the hub 61 of the compressor wheel 6 in order to remove the imbalance of the rotor 3.

Since the nut member 21 is easy to attach/detach from the cartridge 20 and is cheaper than the compressor wheel 6, cutting of the nut member 21 may be prioritized. The first balance correction step S104 need not include performing cutting in a state where the rotor 3 is rotated.

The second imbalance acquisition step S105 (imbalance acquisition step) includes acquiring the imbalance position and amount (mass) of the rotor 3 by the same method as the first imbalance acquisition step S102 described above, after the first balance correction step S104. That is, based on the relationship between the vibration signal acquired in the state where the rotor 3 is rotated and the phase of the rotor 3 corresponding to the vibration signal, the imbalance position and amount (mass) of the rotor 3 causing the vibration are specified.

Figure 4:
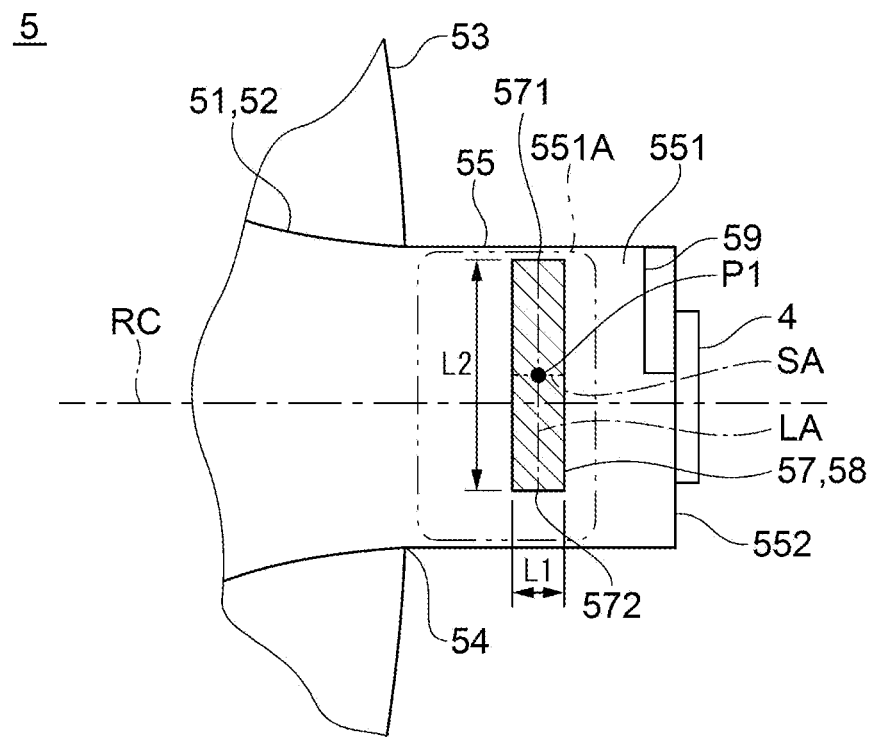
FIG. 4 is an explanatory view for describing an excision target range of a turbine wheel in an embodiment.
Figure 5:
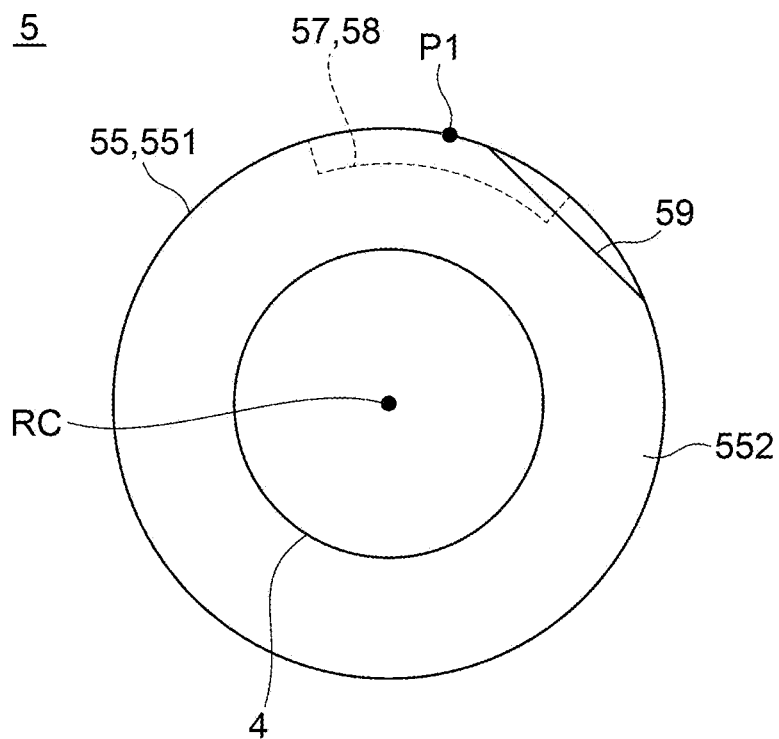
FIG. 5 is an explanatory view for describing the excision target range of the turbine wheel in an embodiment.

FIGS. 4 and 5 are each an explanatory view for describing the excision target range of the turbine wheel in an embodiment.

The second excision target section determination step S106 (excision target section determination step) includes determining, based on the imbalance position and amount of the rotor 3 acquired in the second imbalance acquisition step S105, an excision target range 57 (see FIG. 4, 5) including an imbalance correction position P1 (the optimal position for balancing of the rotor 3) of the turbine wheel 5 and a removal amount in the excision target range 57. Herein, the excision target range 57 is a range to be excised by a laser marker device 8 to be described later in the second balance correction step S107, and the removal amount in the excision target range 57 is an amount (mass) removed from the turbine wheel 5 by the laser marker device 8 in the second balance correction step S107.

In the illustrated embodiment, as shown in FIG. 4, 5, the excision target range 57 is located on a peripheral surface 551 of the boss portion 55 of the turbine wheel 5 described above. The peripheral surface 551 of the boss portion 55 has a uniform distance from a rotation center axis RC, and thus it is unnecessary to change the shape of the excision target range 57 for each circumferential position, making it easy to determine the excision target range 57. In some other embodiments, the excision target range 57 may be located anywhere other than the peripheral surface 551 of the boss portion 55. Further, in the illustrated embodiment, the excision target range 57 is set such that the imbalance correction position P1 is located at the center.

In the illustrated embodiment, second relationship information (such as an effect vector), which indicates a relationship between a mass (such as a unit weight) cut from the turbine wheel 5 of the rotor 3 and a change in magnitude of a vibration due to the above-described cutting of the mass, is acquired in advance through an experiment using the cartridge 20 of the same model number (product). Then, based on the imbalance position and amount (initial imbalance) of the rotor 3 acquired in the second imbalance acquisition step S105 as well as the second relationship information, second deletion information is calculated which includes the position (imbalance correction position) and the excision amount which are optimal for balancing of the rotor 3. Then, based on the above-described second deletion information, the excision target range and the removal amount in the excision target range are determined. For example, referring to setting information which corresponds to the second deletion information and in which the excision target range 57 and the removal amount in the excision target range 57 are set, the excision target range 57 and the removal amount in the excision target range 57 may be determined from the second deletion information.

The second balance correction step S107 includes correcting the balance of the rotor 3 by repeatedly irradiating the excision target range 57 determined in the second excision target section determination step S106 (excision target section determination step) with laser light from the laser marker device 8 to remove by the removal amount in the above-described excision target range 57 from the turbine wheel 5.

The laser light of the laser marker device 8 has a maximum output of not greater than 100 W. As the laser marker device 8, for example, a device can be given which is used to engrave an object by laser light irradiation.

In the illustrated embodiment, as shown in FIG. 3, 6, the laser marker device 8 includes a laser light irradiation part 81 configured to irradiate a laser irradiation target position with laser light (such as a pulse laser), and an irradiation position adjustment part 82 configured to adjust the laser irradiation target position. In the illustrated embodiment, an output of the laser light emitted from the laser light irradiation part 81 is fixed to a predetermined value.

Figure 6:
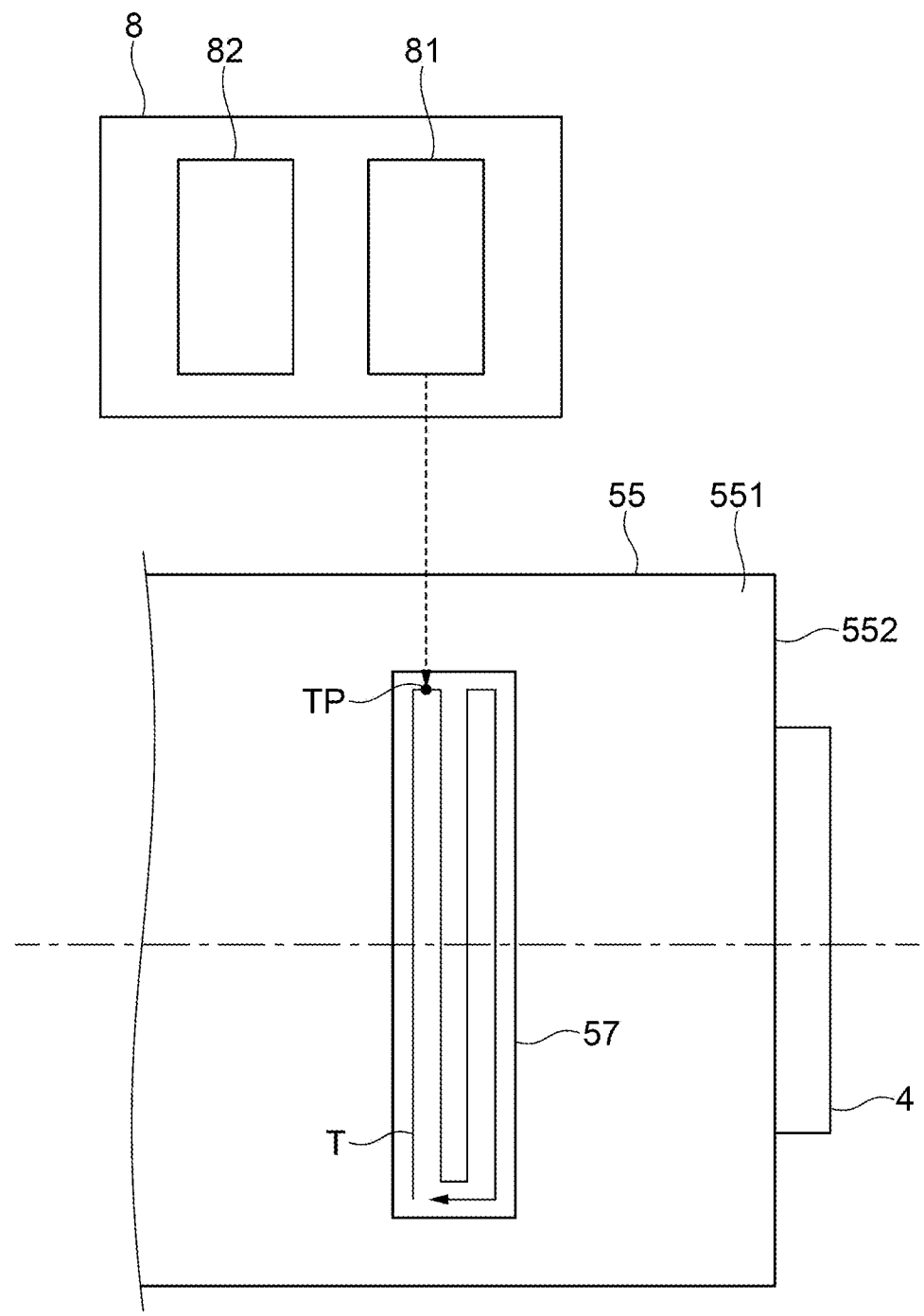
FIG. 6 is an explanatory view for describing a trajectory of a laser irradiation target position per scan in the excision target range.

FIG. 6 is an explanatory view for describing a trajectory of the laser irradiation target position per scan in the excision target range.

As shown in FIG. 6, the irradiation position adjustment part 82 changes a laser irradiation target position TP so that the entire excision target range 57 can be engraved by the laser light for each scan. A trajectory T in FIG. 6 shows an example of the trajectory of the laser irradiation target position TP. The laser marker device 8 repeats scanning a plurality of times (preferably not less than 10 times), and the laser irradiation target position follows the trajectory T a plurality of times, thereby gradually removing imbalance from the excision target range 57.

Figure 7:
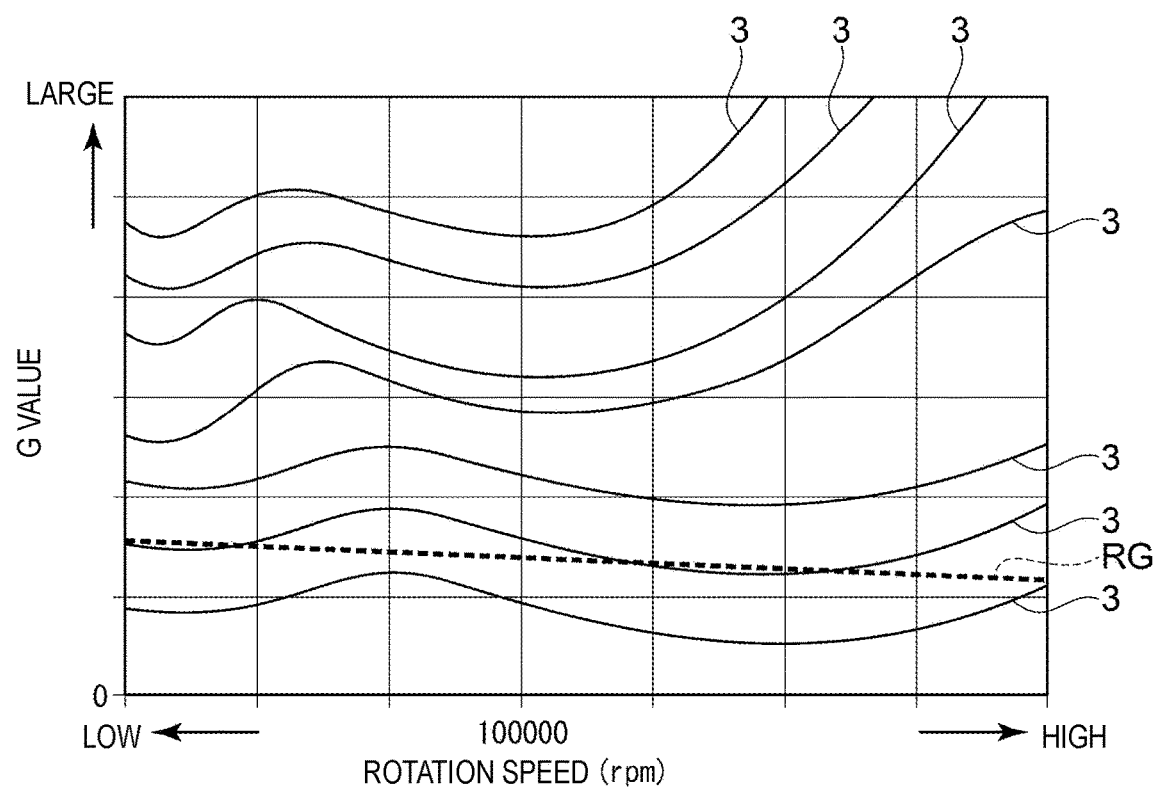
FIG. 7 is a graph showing a relationship between a rotation speed of the rotor and the vibration acceleration (G value) before a first balance correction step.
Figure 8:
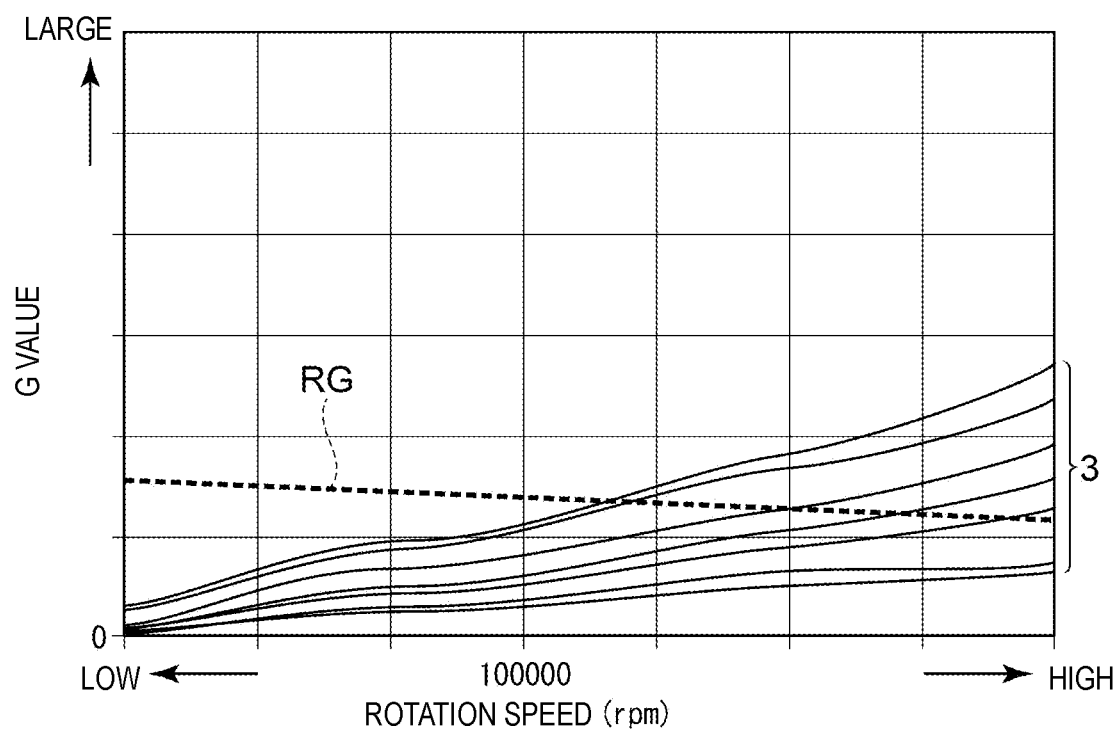
FIG. 8 is a graph showing a relationship between the rotation speed of the rotor and the vibration acceleration (G value) after the first balance correction step.
Figure 9:
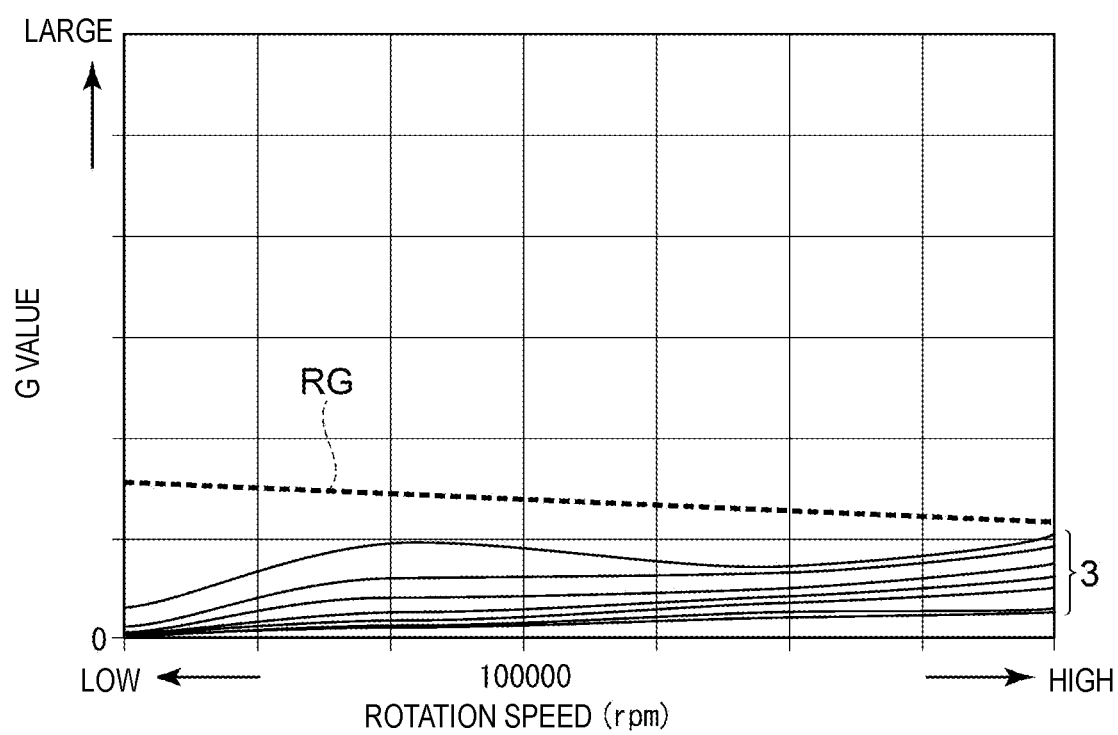
FIG. 9 is a graph showing a relationship between the rotation speed of the rotor and the vibration acceleration (G value) after a second balance correction step.

FIG. 7 is a graph showing a relationship between a rotation speed of the rotor and the vibration acceleration (G value) before the first balance correction step. FIG. 8 is a graph showing a relationship between the rotation speed of the rotor and the vibration acceleration (G value) after the first balance correction step. FIG. 9 is a graph showing a relationship between the rotation speed of the rotor and the vibration acceleration (G value) after the second balance correction step.

As shown in FIG. 7, the rotor 3 before the first balance correction step S104 has the vibration acceleration (G value) often exceeding a reference vibration acceleration RG in both low rotation (such as less than one hundred thousand rotations) and high rotation (such as not less than one hundred thousand rotations). By contrast, as shown in FIG. 8, the imbalance of the rotor 3 after the first balance correction step S104 is significantly reduced by the balance correction in the first balance correction step S104, and particularly in the low rotation (such as less than one hundred thousand rotations), the vibration acceleration (G value) is decreased relative to the reference vibration acceleration RG. However, the rotor 3 after the first balance correction step S104 may have the vibration acceleration (G value) exceeding the reference vibration acceleration RG in the high rotation (such as not less than one hundred thousand rotations).

FIG. 9 shows a result of performing the second balance correction step S107 on the rotor 3 whose vibration acceleration (G value) exceeds the reference vibration acceleration RG, in measurement after the first balance correction step S104. As shown in FIG. 9, the imbalance of the rotor 3 after the second balance correction step S107 is significantly improved by the balance correction in the second balance correction step, and in the high rotation (such as not less than one hundred thousand rotations), the vibration acceleration (G value) is decreased relative to the reference vibration acceleration RG. The result indicates that the balance adjustment in the second balance correction step S107 is very effective for finely adjusting the balance of the rotor 3.

As shown in FIG. 1, the balance adjustment method 1 for the rotor according to some embodiments includes, after the first balance correction step S104 described above, the second imbalance acquisition step S105 (imbalance acquisition step) of acquiring the imbalance position and amount (mass) of the rotor 3, the second excision target section determination step S106 (excision target section determination step) of determining, based on the imbalance position and amount (mass) of the rotor 3 acquired in the second imbalance acquisition step S105, the excision target range 57 (for example, see FIG. 4) including the imbalance correction position P1 of the turbine wheel 5 and the removal amount in the excision target range 57, and the second balance correction step S107 of correcting the balance of the rotor 3 by repeatedly irradiating the excision target range 57 determined in the second excision target section determination step S106 with the laser light from the laser marker device 8 to remove by the above-described removal amount from the turbine wheel 5.

With the above method, the second balance correction step S107 includes correcting the balance of the rotor 3 by repeatedly irradiating the excision target range 57 with the laser light from the laser marker device 8 to remove the imbalance from the turbine wheel 5 by the above-described removal amount (the removal amount in the excision target range 57). Herein, the laser marker device 8 has a smaller laser light output than a laser processing machine for metal processing, and can reduce the removal amount from the turbine wheel 5 per scan in the excision target range 57. Thus, accurate removal by a desired removal amount is possible by repeatedly scanning the excision target range 57. That is, the laser marker device 8 is suitable for finely adjusting the balance of the rotor 3 in the second balance correction step S107. Further, the laser marker device 8 can accurately process the turbine wheel 5 even if the turbine wheel 5 is made of a difficult-to-cut material. Thus, with the above method, it is possible to improve accuracy in balance adjustment of the rotor 3. Further, since the laser marker device 8 is cheaper than the laser processing machine for metal processing, it is possible to suppress the increase in equipment cost.

In some embodiments, for example, as shown in FIG. 4, the above-described excision target range 57 is located on the peripheral surface 551 of the boss portion 55 of the turbine wheel 5. In the illustrated embodiment, the excision target range 57 is located on a peripheral surface 551A away from an end surface 552 (tip) of the boss portion 55 by not less than a predetermined distance (such as 1 mm) in the axial direction of the turbine wheel 5 (an extension direction of the rotation center axis RC). The end surface 552 of the boss portion 55 is cut off at the time of balance adjustment in the turbine rotor 50 alone, and it may be impossible to secure a sufficient cutting allowance. Thus, the excision target range 57 is preferably located on the above-described peripheral surface 551A.

With the above method, the excision target range 57 is located on the peripheral surface 551 of the boss portion 55 of the turbine wheel 5. In order to remove a part of the turbine wheel 5 as imbalance from the excision target range 57 located on the peripheral surface 551 of the boss portion 55, the laser light of the laser marker device 8 is emitted along a direction intersecting with (for example, orthogonal to) the axial direction of the turbine wheel 5. Herein, the boss portion 55 of the turbine wheel 5 has a smaller centrifugal force, which is generated during the rotation of the turbine wheel 5, than the hub 51 and the blades 53, making it possible to reduce an adverse effect (such as a decrease in high cycle fatigue strength) due to the removal processing in the excision target range 57.

Then, since the peripheral surface 551 of the boss portion 55 has the longer distance from the rotation center axis RC of the boss portion 55 (turbine wheel 5) than the end surface 552 of the boss portion 55, it is possible to reduce the removal amount needed to eliminate the imbalance. Further, the end surface 552 of the boss portion 55 is cut off at the time of balance adjustment in the turbine rotor 50 alone, and it may be impossible to secure the sufficient cutting allowance. However, the peripheral surface 551 of the boss portion 55 can secure the sufficient cutting allowance even if the removal amount is large.

In some embodiments, for example, as shown in FIG. 4, the above-described excision target range 57 has a long axis LA along the circumferential direction of the turbine wheel 5, and has a short axis SA along the axial direction of the above-described turbine wheel. By repeatedly irradiating the excision target range 57 with the laser light from the laser marker device 8 (see FIG. 3, 6), a laser mark 58 engraved by the laser marker device 8 is formed on the peripheral surface 551 of the boss portion 55.

In the illustrated embodiment, the excision target range 57 is set in a rectangular shape, and the laser mark 58 has a rectangular concave shape. The long axis LA may extend in the same direction as the circumferential direction of the turbine wheel 5, or may be inclined within a range of ±45° with respect to the circumferential direction of the turbine wheel 5. Further, the short axis SA may extend in the same direction as the axial direction of the turbine wheel 5, or may be inclined within a range of ±45° with respect to the axial direction of the turbine wheel 5.

With the above method, the excision target range 57 has the long axis LA along the circumferential direction of the turbine wheel 5, and has the short axis SA along the axial direction of the turbine wheel 5. Since the peripheral surface 551 of the boss portion 55 of the turbine wheel 5 has the circumferential length longer than the axial length, the excision target range 57 having the long axis LA along the circumferential direction easily secures its range.

In some embodiments, the condition of $1.5 \leq L2/L1 \leq 100$ is satisfied, where L1 is a length of the short axis SA extending along the axial direction of the turbine wheel 5, and L2 is a length of the long axis LA extending along the circumferential direction of the turbine wheel 5.

If the length L2 of the long axis LA of the excision target range 57 is too long, distances from the imbalance correction position to both end portions 571, 572 of the long axis LA extending along the circumferential direction of the turbine wheel 5 increase, which may make the both end portions less effective in correcting imbalance. Further, if the length L2 of the long axis LA of the excision target range 57 is too short, it may be impossible to remove by the removal amount needed to eliminate the imbalance. With the above method, since the condition of $1.5 \leq L2/L1 \leq 100$ is satisfied, it is possible to suppress the increase in distances from the imbalance correction position P1 to the both end portions 571, 572 of the long axis LA, and to make the both end portions 571, 572 effective in correcting the imbalance over the entire excision target range 57. Further, it is possible to secure the removal amount needed to eliminate the imbalance.

Figure 10:
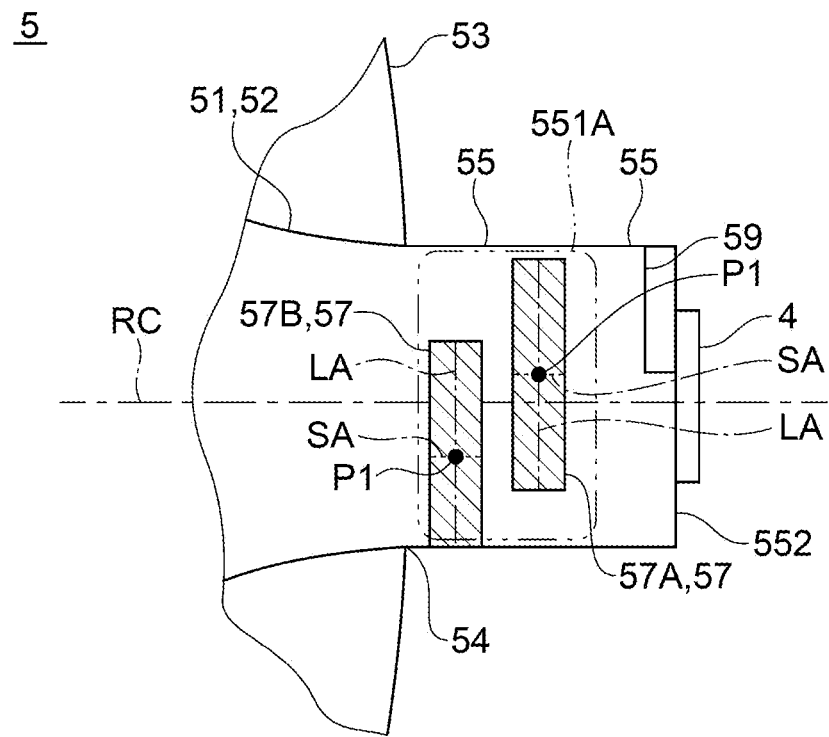
FIG. 10 is an explanatory view for describing the excision target range of the turbine wheel in an embodiment.

FIG. 10 is an explanatory view for describing the excision target range of the turbine wheel in an embodiment.

In some embodiments, as shown in FIG. 10, the above-described excision target range 57 has the long axis LA along the circumferential direction of the turbine wheel 5, and has the short axis SA along the axial direction of the above-described turbine wheel. The above-described excision target range 57 includes a first excision target range 57A and a second excision target range 57B disposed alongside the first excision target range 57A in the axial direction of the turbine wheel 5. The range of the second excision target range 57B may be set based on the imbalance position and amount (mass) acquired after balance adjustment in the first excision target range 57A.

With the above method, since each of the plurality of excision target ranges 57 (the first excision target range 57A, the second excision target range 57B) has the short axis SA along the axial direction of the turbine wheel 5, the plurality of excision target ranges 57 can be located on the peripheral surface 551 of the boss portion 55 of the turbine wheel 5. Further, since the plurality of excision target ranges 57 are located on the peripheral surface 551 of the boss portion 55 of the turbine wheel 5 alongside each other in the axial direction of the turbine wheel 5, compared with a case where the single excision target range 57 is located, it is possible to increase the amount removable from the boss portion 55 of the turbine wheel 5 while suppressing an excessive increase in the long axis LA of each excision target range 57.

In the above-described balance adjustment method 1 for the rotor, the second imbalance acquisition step S105 (imbalance acquisition step), the second excision target section determination step S106 (excision target section determination step), and the second balance correction step S107 may be performed a plurality of times in this order.

In some embodiments, the range of the above-described second excision target range 57B may be set based on the imbalance position and amount (mass) acquired after the balance adjustment in the first excision target range 57A. In this case, it is possible to improve accuracy in the balance adjustment in the second excision target range 57B.

Figure 11:
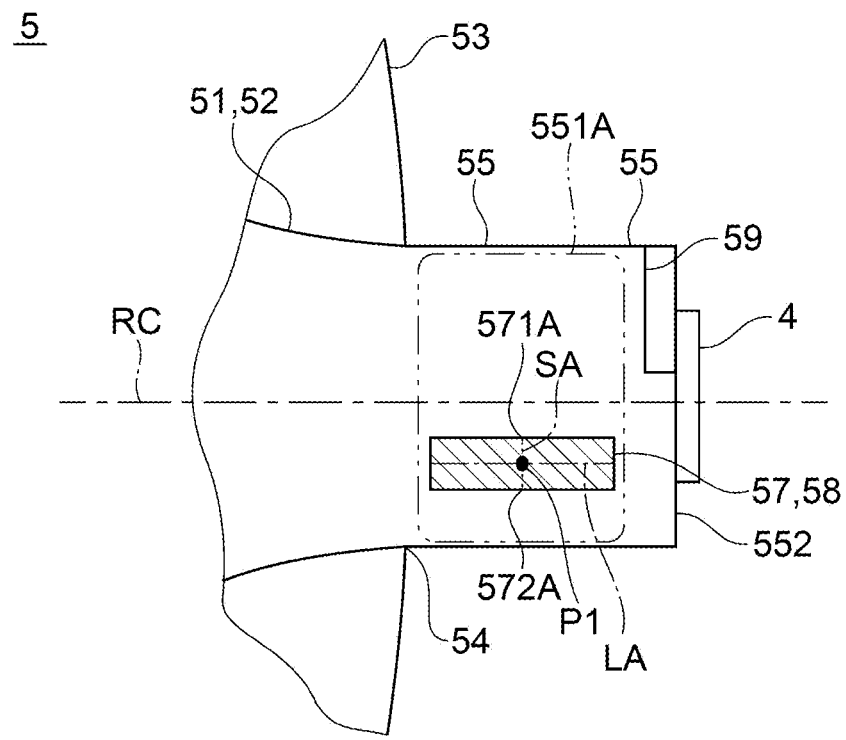
FIG. 11 is an explanatory view for describing the excision target range of the turbine wheel in an embodiment.

FIG. 11 is an explanatory view for describing the excision target range of the turbine wheel in an embodiment.

In some embodiments, as shown in FIG. 11, the above-described excision target range 57 has the short axis SA along the circumferential direction of the turbine wheel 5, and the long axis LA along the axial direction of the turbine wheel 5. In this case, it is possible to suppress an increase in distances from the imbalance correction position P1 to both end portions 571A, 572A of the short axis SA extending along the circumferential direction of the turbine wheel 5, allowing the both end portions 571A, 572A to be effective in correcting the imbalance over the entire excision target range 57.

Figure 12:
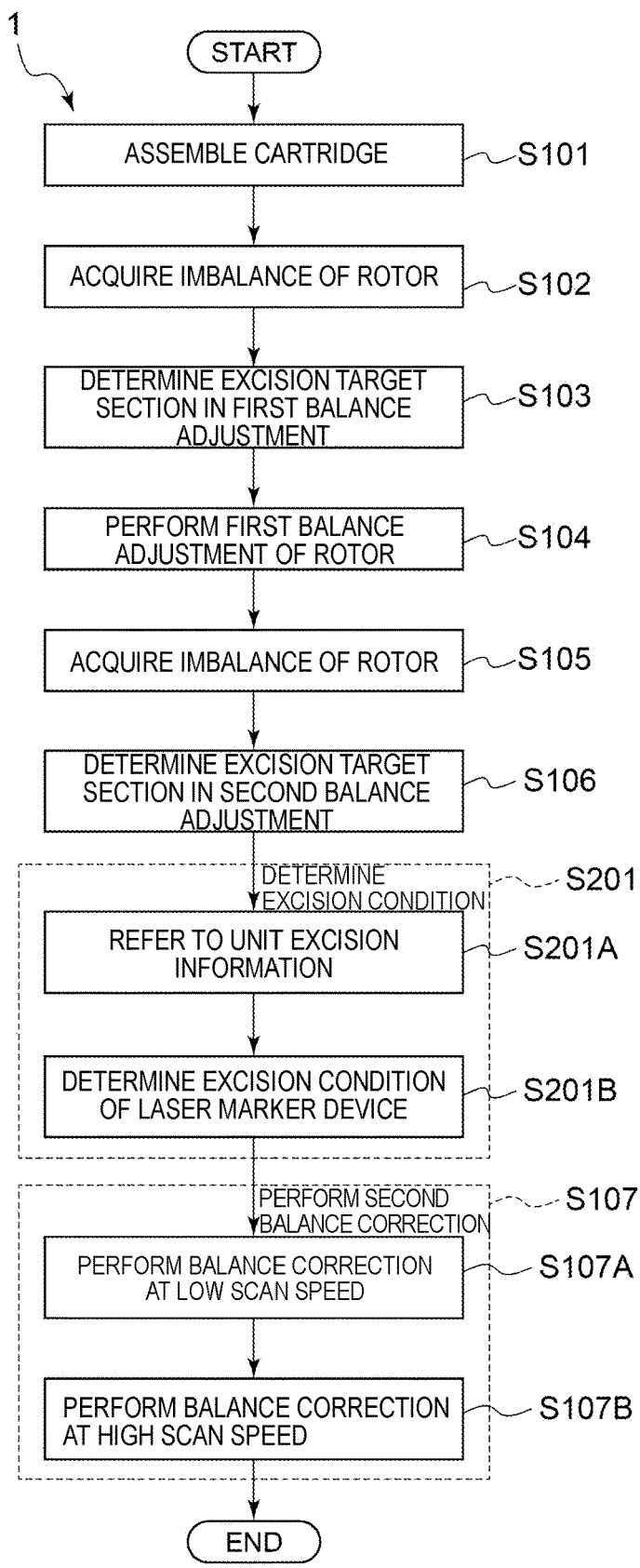
FIG. 12 is a flowchart of the balance adjustment method for the rotor according to an embodiment.

FIG. 12 is a flowchart of the balance adjustment method for the rotor according to an embodiment.

In some embodiments, as shown in FIG. 12, the above-described balance adjustment method 1 for the rotor further includes an excision condition determination step S201. The excision condition determination step S201 is performed after the second excision target section determination step S106 (excision target section determination step) and before the second balance correction step S107.

Figure 13:
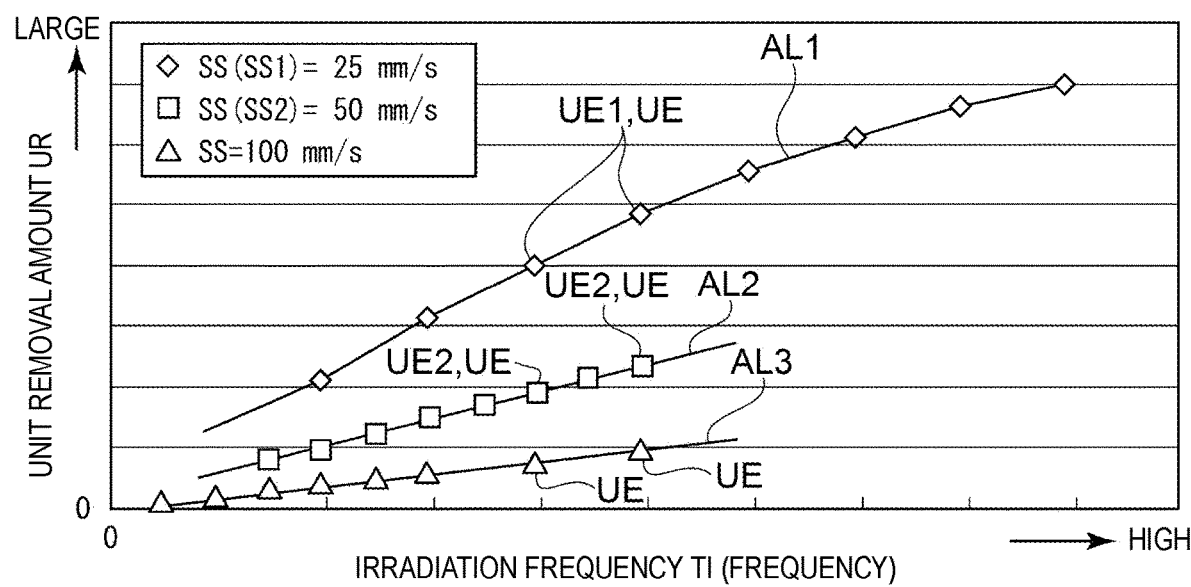
FIG. 13 is an explanatory graph for describing an example of unit excision information in an embodiment.

FIG. 13 is an explanatory graph for describing an example of unit excision information in an embodiment.

Before the excision condition determination step S201, at least one piece of unit excision information UE is prepared in advance where a combination of a laser light irradiation frequency TI and a laser light scan speed SS of the laser marker device 8 is associated with a unit removal amount UR which is a removal amount per unit area. The unit excision information UE may be prepared before the start of the balance adjustment method 1. The unit excision information UE may be acquired through an experiment in advance by using the same type of material as the turbine wheel 5. However, in order to improve accuracy, the unit excision information UE is preferably acquired in advance through an experiment by using the cartridge 20 of the same model number (product).

The above-described at least one piece of unit excision information UE may include not only the information (information indicating the relationship) on the combination of the irradiation frequency TI and the scan speed SS and the unit removal amount UR in the above-described combination, but also information (individual information, such as numerical values) on the irradiation frequency TI, the scan speed, and the unit removal amount whose relationship is indicated by the information (information indicating the relationship).

Further, in a certain embodiment, the above-described at least one piece of unit excision information UE is electronic data such as a map, a table, or a machine learning model, and is stored in a database. The above-described computing device 763 has a general configuration as a computer (for example, a CPU, a memory, an internal storage, and the like), and is configured to be able to refer to the above-described database. The above-described database may be installed in the computing device 763.

FIG. 13 is a graph which has the laser light irradiation frequency TI of the laser marker device 8 at the abscissa and has the unit removal amount UR (the removal amount per unit area) at the ordinate, and plots a different marker for each of the laser light scan speeds SS (25 mm/s, 50 mm/s, 100 mm/s). That is, the one plot in FIG. 13 indicates the unit excision information UE (including the information indicating the above-described relationship and the individual information), and FIG. 13 shows, by approximate lines AL1, AL2, AL3 for the scan speeds SS and a plurality of plots, respectively, a plurality of pieces of unit excision information UE which are different in irradiation frequency TI and scan speed SS. Further, the approximate lines AL1, AL2, AL3 for the scan speeds SS in FIG. 13, respectively, indicate the plurality of pieces of unit excision information UE which are different in irradiation frequency TI.

The laser light irradiation frequency TI of the laser marker device 8 indicates the number of repetitions of the above-described scan (the number of times of following the trajectory T), and the laser light scan speed SS indicates a moving sped at which the irradiation position adjustment part 82 moves through the laser irradiation target position TP.

The excision condition determination step S201 includes referring to the above-described at least one piece of unit excision information UE (S201A), and determining the laser light irradiation frequency TI and the laser light scan speed SS in the second balance correction step S107 from the excision target range 57 and the removal amount in the excision target range 57 determined in the second excision target section determination step S106 (excision target section determination step) (S201B).

The excision condition determination step S201 includes obtaining the removal amount per unit area in the excision target range 57 by dividing the removal amount in the excision target range 57 by the area of the excision target range 57. By referring to the at least one piece of unit excision information UE, it is possible to determine the irradiation frequency TI and the scan speed SS corresponding to the removal amount per unit area in the excision target range 57. In a certain embodiment, the above-described computing device 763 refers to the database storing the unit excision information UE (S201A), and performs the above-described step S201B.

With the above method, based on the relationship (unit excision information UE) between the laser light irradiation frequency TI and the laser light scan speed SS of the laser marker device 8, and the unit removal amount UR which is the removal amount per unit area, the laser light irradiation frequency TI and the laser light scan speed SS in the second balance correction step S107 are determined from the excision target range 57 and the removal amount determined in the second excision target section determination step S106 (excision target section determination step). In this case, a difference between the removal amount determined in the second excision target section determination step S106 and an actual amount removed in the second balance correction step S107 can be reduced, making it possible to remove the imbalance of an appropriate amount from the turbine wheel 5. Thus, with the above method, it is possible to improve accuracy in balance adjustment of the rotor 3.

FIG. 14 is an explanatory table for describing an example of the unit excision information and unit excision period information in an embodiment. FIG. 14 shows a plurality of pieces of unit excision information UE (UE1 to UE5), respectively, having different scan speeds SS (SS1 to SS5) and irradiation frequencies TI (TI1 to TI5) with respect to the same unit removal amount UR (UR1). Herein, each of the scan speeds SS (SS1 to SS5) in FIG. 14 is higher, as an accompanying numerical value is larger. That is, SS1 is the lowest, and SS5 is the highest. As the scan speed SS increases, the removal amount per scan decreases, and thus each of the irradiation frequencies TI (TI1 to TI5) in FIG. 14 increases as an accompanying numerical value is larger.

FIG. 14 also shows periods (unit excision periods UT, UT1 to UT5) required for the laser marker device 8 to excise by the unit removal amount UR corresponding to excision conditions (the respective combinations of the scan speeds SS and the irradiation frequencies TI), under the above-described excision conditions. FIG. 14 further shows the plurality of pieces of information (unit excision period information) in which the excision conditions and the unit excision periods UT are associated with each other. Each of the unit excision periods UT (UT1 to UT5) in FIG. 14 corresponds to a corresponding one of the combinations of the scan speeds SS and the irradiation frequencies TI, and is longer as an accompanying numerical value is larger. That is, UT1 is the shortest period, and UT5 is the longest period. Further, FIG. 14 shows cycle times CT (CT1 to CT5) under the respective excision conditions. The "cycle time" means a time required for the laser marker device 8 to remove the imbalance from the turbine wheel 5 by the amount necessary for balance adjustment, in the second balance correction step S107.

In some embodiments, for example, as shown in FIG. 14, the above-described at least one piece of unit excision information UE includes the plurality of pieces of unit excision information UE each having the different scan speed SS with respect to the same unit removal amount UR described above. The above-described excision condition determination step S201 includes determining, as the irradiation frequency TI and the scan speed SS in the second balance correction step S107, the irradiation frequency TI and the scan speed SS of the unit excision information UE with the highest scan speed SS among the plurality of pieces of unit excision information UE.

In the example shown in FIG. 14, since the unit excision information UE5 has the highest scan speed SS among the plurality of pieces of unit excision information UE (UE1 to UE5), the excision condition determination step S201 includes determining the irradiation frequency TI5 and the scan speed SS5 of the unit excision information UE5 as the irradiation frequency TI and the scan speed SS in the second balance correction step.

Although the imbalance removal amount per irradiation frequency NI (scan) is decreased if the laser light scan speed SS is increased, and it is possible to reduce a difference between an expected removal amount and the actual removal amount of the imbalance. That is, it is possible to improve imbalance removal accuracy. By contrast, if the laser light scan speed SS is decreased, although the difference between the expected removal amount and the actual removal amount of the imbalance is increased as compared with the case where the scan speed SS is high, it is possible to increase the imbalance removal amount per irradiation frequency NI (scan). With the above method, since the excision condition determination step S201 includes determining, as the irradiation frequency NI and the scan speed SS in the second balance correction step S107, the irradiation frequency NI and the scan speed SS of the unit excision information UE with the highest scan speed SS among the plurality of pieces of unit excision information UE, it is possible to improve imbalance removal accuracy.

In some embodiments, for example, as shown in FIG. 14, each scan speed SS of the plurality of pieces of unit excision information UE described above is less than an upper threshold USS of the scan speed SS. The excision condition determination step S201 includes determining, as the irradiation frequency NI and the scan speed SS in the second balance correction step S107, the irradiation frequency NI and the scan speed SS of the unit excision information UE with the highest scan speed SS among the plurality of pieces of unit excision information UE including the scan speed SS less than the upper threshold USS.

In the example shown in FIG. 14, the scan speed SS5 of the unit excision information UE5 is greater than the upper threshold USS of the scan speed SS, and is thus excluded from the one piece of unit excision information UE adopted in the second balance correction step S107. The unit excision information UE4 has the highest scan speed SS among the plurality of pieces of unit excision information UE (UE1 to UE4) excluding the unit excision information UE5, and thus the irradiation frequency TI and the scan speed SS of the unit excision information UE4 are determined as the irradiation frequency TI and the scan speed SS in the second balance correction step.

If the laser light scan speed SS is increased, it is possible to improve imbalance removal accuracy as compared with the case where the scan speed SS is low. However, if the scan speed SS is increased, the imbalance removal amount per irradiation frequency NI (scan) is reduced, increasing the irradiation frequency NI and increasing the cycle time CT in the second balance correction step S107. For example, in a manufacturing process of the turbocharger 2 including the rotor 3, if the cycle time CT in the second balance correction step S107 is longer than that in other processes, the productivity of the turbocharger 2 decreases. With the above method, since the irradiation frequency NI and the scan speed SS of the unit excision information UE with the highest scan speed SS among the plurality of pieces of unit excision information UE including the scan speed SS less than the upper threshold USS are determined as the irradiation frequency NI and the scan speed SS in the second balance correction step S107, it is possible to make the scan speed SS in the second balance correction step S107 less than the upper threshold USS. Thus, it is possible to prevent the cycle time CT in the second balance correction step S107 from becoming too long, while improving imbalance removal accuracy.

In some embodiments, for example, as shown in FIG. 14, the above-described at least one piece of unit excision information UE includes the plurality of pieces of unit excision information UE each having the different scan speed SS with respect to the same unit removal amount UR described above. The above-described excision condition determination step S201 includes determining, as the irradiation frequency TI and the scan speed SS in the second balance correction step S107, the irradiation frequency TI and the scan speed SS of the unit excision information UE with the minimum cycle time CT in the above-described second balance correction step among the plurality of pieces of unit excision information UE.

In a certain embodiment, a plurality of pieces of unit excision period information RT are prepared in advance before the excision condition determination step S201. The unit excision period information RT includes at least information indicating the relationship between the combination of the scan speed SS and the irradiation frequency TI in the unit excision information UE and the unit excision period UT. The above-described plurality of pieces of unit excision period information RT may be prepared before the start of the balance adjustment method 1. The unit excision period information RT may be acquired through an experiment in advance by using the laser marker device 8, or may be acquired by calculating the unit excision period UT from various conditions such as the scan speed SS, the irradiation frequency T1, the unit removal amount UR, and the trajectory T.

The excision condition determination step S201 may include specifying the one piece of unit excision information UE adopted in the second balance correction step S107, by referring to the plurality of pieces of unit excision period information RT. The above-described cycle time CT corresponds to the unit excision period UT, if the area of the excision target range 57 is equal. That is, as shown in FIG. 14, the cycle time CT increases as the unit excision period UT is longer, and the cycle time CT decreases as the unit excision period UT is shorter. Each of the cycle times CT (CT1 to Ct5) in FIG. 14 is longer, as an accompanying numerical value is larger. That is, CT1 is the shortest time, and CT5 is the longest time. Thus, when the one piece of unit excision information UE is specified, comparison of the unit excision period UT, instead of the cycle time CT, may be made.

Further, in another certain embodiment, a period acquired by multiplying the unit excision period UT by the area of the excision target range 57 is regarded as the cycle time CT, and when the one piece of unit excision information UE is specified, comparison of the cycle time CT may be made in determining the excision condition.

In the example shown in FIG. 14, since the unit excision information UE1 has the minimum unit excision period UT and cycle time CT among the plurality of pieces of unit excision information UE (UE1 to UE5), the excision condition determination step S201 includes determining the irradiation frequency TI1 and the scan speed SS1 of the unit excision information UE1 as the irradiation frequency TI and the scan speed SS described above in the second balance correction step.

The above-described plurality of pieces of unit excision period information RT may include not only the information (information indicating the relationship) on the combination of the irradiation frequency TI and the scan speed SS and the unit excision period UT in the above-described combination, but also information (individual information, such as numerical values) on the irradiation frequency TI, the scan speed SS, and the unit excision period UT whose relationship is indicated by the information (information indicating the relationship).

Further, in a certain embodiment, the above-described plurality of pieces of unit excision period information RT are each electronic data such as a map, a table, or a machine learning model, and are stored in the above-described database. In a certain embodiment, the above-described computing device 763 refers to the database storing the unit excision period information RT (S201A), and performs the above-described step S201B.

With the above method, since the above-described excision condition determination step S201 includes determining, as the above-described irradiation frequency TI and the above-described scan speed SS in the second balance correction step S107, the irradiation frequency TI and the scan speed SS of the unit excision information UE with the minimum cycle time in the above-described second balance correction step among the plurality of pieces of unit excision information UE, it is possible to shorten the cycle time in the second balance correction step S107.

In some embodiments, for example, as shown in FIG. 14, each scan speed SS of the plurality of pieces of unit excision information UE described above is greater than a lower threshold LSS of the scan speed SS. The excision condition determination step S201 includes determining, as the irradiation frequency NI and the scan speed SS in the second balance correction step S107, the irradiation frequency NI and the scan speed SS of the unit excision information UE with the minimum cycle time CT among the plurality of pieces of unit excision information UE including the scan speed SS greater than the lower threshold LSS.

In the example shown in FIG. 14, the scan speed SS1 of the unit excision information UE1 is less than the lower threshold LSS of the scan speed SS, and is thus excluded from the one piece of unit excision information UE adopted in the second balance correction step S107. The unit excision information UE2 has the minimum unit excision period UT and cycle time CT among the plurality of pieces of unit excision information UE (UE2 to UE5) excluding the unit excision information UE1, and thus the irradiation frequency TI and the scan speed SS of the unit excision information UE2 are determined as the irradiation frequency TI and the scan speed (SS) described above in the second balance correction step.

If the lager light scan speed SS is decreased, the imbalance removal amount per irradiation frequency NI (scan) is increased as compared with the case where the scan speed SS is high, making it possible to decrease the irradiation frequency NI and to shorten the cycle time CT in the second balance correction step S107. However, if the scan speed SS is decreased, the difference between the expected removal amount and the actual removal amount of the imbalance is increased, decreasing imbalance removal accuracy.

For example, as shown in FIG. 13, if the scan speed SS is high (for example, 50 mm/s, 100 mm/s) in a case where the scan speed SS is fixed, the laser light irradiation frequency TI of the laser marker device 8 and the unit removal amount UR are in a linear relationship. By contrast, if the scan speed SS is low (for example, 25 mm/s), the removal amount of the imbalance removed per irradiation frequency NI (scan) is large, and a depth in the excision target range 57 increases. If the depth in the excision target range 57 increases, the distance between the laser light irradiation part 81 and the laser irradiation target position TP increases as compared with the start of laser light irradiation, making it impossible to narrow the focus of the laser light and to remove the unit removal amount UR corresponding to the irradiation frequency TI. Thus, the difference between the expected removal amount and the actual removal amount of the imbalance is increased, decreasing imbalance removal accuracy.

With the above method, since the irradiation frequency NI and the scan speed SS of the unit excision information UE with the minimum cycle time CT among the plurality of pieces of unit excision information UE including the scan speed SS greater than the lower threshold LSS are determined as the irradiation frequency NI and the scan speed SS in the second balance correction step S107, it is possible to make the scan speed SS in the second balance correction step S107 greater than the lower threshold LSS. Thus, it is possible to secure imbalance removal accuracy while shortening the cycle time CT in the second balance correction step S107.

In some embodiments described above, although the unit excision information UE whose scan speed SS is greater than the upper threshold USS or the unit excision information UE whose scan speed SS is less than the lower threshold LSS is excluded from the one piece of unit excision information UE adopted in the second balance correction step S107, the unit excision information UE whose unit excision period UT or cycle time CT is greater than the upper threshold or less than the lower threshold may be excluded from the one piece of unit excision information UE adopted in the second balance correction step S107.

For example, in a certain embodiment, the unit excision period UT corresponding to the irradiation frequency NI and the scan speed SS of each of the plurality of pieces of unit excision information UE described above is less than an upper threshold UUT of the unit excision period UT and greater than a lower threshold LUT of the unit excision period UT. The excision condition determination step S201 includes determining the one piece of unit excision information UE adopted in the second balance correction step S107 from among the plurality of pieces of unit excision information UE including the irradiation frequency NI and the scan speed SS corresponding to the unit excision period UT less than the upper threshold UUT and greater than the lower threshold LUT. Further, in a certain embodiment, the cycle time CT corresponding to the unit removal amount UR, the irradiation frequency NI, and the scan speed SS of each of the plurality of pieces of unit excision information UE described above is less than an upper threshold UCT of the cycle time CT and greater than a lower threshold LCT of the unit excision period UT. The unit excision information UE that does not satisfy the condition (for example, less than the upper threshold) may be excluded in the above-described step S201A or S201B, or may not be prepared before the above-described step S201A.

In some embodiments, for example, as shown in FIG. 13, the above-described at least one piece of unit excision information UE includes the plurality of pieces of unit excision information UE each having the different scan speed SS. The above-described excision condition determination step S201 includes determining, as the irradiation frequency TI and the scan speed SS in the second balance correction step S107, the irradiation frequency TI and the scan speed SS of each of first unit excision information UE6 including a first scan speed SS6 as the scan speed SS and second unit excision information UE7 including a second scan speed SS7 higher than the first scan speed SS6 as the scan speed SS, from among the plurality of pieces of unit excision information UE.

The second balance correction step S107 includes a low-speed correction step S107A in which the laser light scan speed SS is the first scan speed SS6, and a high-speed correction step S107B in which the laser light scan speed SS is the second scan speed SS7.

In a certain embodiment, the excision condition determination step S201 includes a step of dividing, based on the first unit excision information UE6 and the second unit excision information UE7, the removal amount in the excision target range 57 determined in the second excision target section determination step S106 (excision target section determination step) into a low-speed removal amount in which the excision target range 57 is removed by the low-speed correction step S107A and a high-speed removal amount in which the excision target range 57 is removed by the high-speed correction step S107B. Then, from the excision target range 57, the low-speed removal amount, and the high-speed removal amount, based on the first unit excision information UE6 and the second unit excision information UE7, the laser light irradiation frequency TI and the laser light scan speed SS in each of the low-speed correction step S107A and the high-speed correction step S107B are determined.

With the above method, since the excision condition determination step S201 includes determining the irradiation frequency TI and the scan speed SS of each of the two pieces of unit excision information UE (the first unit excision information UE6, the second unit excision information UE7) different from each other in scan speed SS as the irradiation frequency TI and the scan speed SS in the second balance correction step S107, it is possible to change the laser light scan speed SS in the second balance correction step S107. Thus, the imbalance can quickly be removed by scanning with the laser light at the first scan speed SS6 lower than the second scan speed SS7, it is possible to suppress the increase in cycle time. Further, by scanning with the laser light at the second scan speed SS7 higher than the first scan speed SS6, it is possible to secure imbalance removal accuracy.

In a certain embodiment, the above-described low-speed removal amount is larger than the above-described high-speed removal amount. In this case, it is possible to quickly remove the imbalance.

In some embodiments, as shown in FIG. 12, the second balance correction step S107 includes the above-described low-speed correction step S107A (former half correction step), and the above-described high-speed correction step S107B (latter half correction step) performed after the low-speed correction step S107A.

With the above method, since the balance correction in the second balance correction step S107 has the relationship between the laser light irradiation frequency TI and the laser light scan speed SS of the laser marker device 8, and the unit removal amount UR serving as the removal amount per unit area, which is weakened as the cutting depth increases, it is possible to suppress the decrease in imbalance removal accuracy by scanning with the laser light at the second scan speed SS7 higher than the first scan speed SS6 in the latter half correction step.

In some embodiments, the above-described laser marker device 8 has the maximum output of laser light described above which is not greater than 100 W. In this case, since the laser marker device 8 has the maximum output of laser light which is not greater than 100 W, it is possible to reduce the removal amount from the turbine wheel 5 per scan, making accurate removal by the desired removal amount possible by repeatedly scanning the excision target range 57. Further, since the laser marker device 8 whose maximum output of laser light is not greater than 100 W is cheaper than a laser marker device whose maximum output of laser light exceeds 100 W, it is possible to suppress the increase in equipment cost. In particular, since the turbine wheel 5 of the small turbocharger 2 for an automobile or the like is small, the maximum output of laser light is preferably not greater than 50 W. More preferably, the maximum output of laser light is not less than 15 W and not greater than 50 W.

The method for manufacturing the turbocharger 2 according to some embodiments includes the above-described balance adjustment method 1 for the rotor. In this case, since the balance of the rotor 3 of the turbocharger 2 is accurately adjusted in the balance adjustment method 1 for the rotor, it is possible to suppress the vibration and noise caused during the rotation of the rotor 3.

The turbocharger 2 according to some embodiments includes the rotor 3 in which the turbine wheel 5 and the compressor wheel 6 are connected via the rotational shaft 4. Then, as shown in FIG. 2, the above-described turbine wheel 5 has the laser mark 58 engraved on the peripheral surface 551 of the boss portion 55 by the laser marker device 8.

With the above configuration, since the turbocharger 2 has the laser mark 58 engraved on the peripheral surface 551 of the boss portion 55 of the turbine wheel 5 by the laser marker device 8, the balance of the rotor 3 has already accurately been adjusted, and it is possible to suppress the vibration and noise caused during the rotation of the rotor 3.

For example, it is possible to accurately remove the imbalance by repeatedly irradiating the peripheral surface 551 of the boss portion 55 of the turbine wheel 5 with laser light from the laser marker device 8, making it possible to improve accuracy in balance adjustment of the rotor 3. Further, since the laser marker device 8 is cheaper than the laser processing machine for metal processing, it is possible to suppress the increase in equipment cost.

Further, in the illustrated embodiment, as shown in FIG. 4, 5, the turbine wheel 5 has a cut mark 59 cut in the end surface 552 of the boss portion 55 to remove the imbalance. In this case, the balance of the turbine wheel 5 alone has already accurately been adjusted, and it is possible to suppress the vibration and noise caused during the rotation of the rotor 3.

Further, in the illustrated embodiment, as shown in FIG. 2, the turbocharger 2 has a compressor-side cut mark 26 cut in at least one of the outer surface 212 of the nut member 21 and the outer peripheral surface 62 of the hub 61 of the compressor wheel 6 to remove the imbalance. In this case, the balance of the rotor 3 in the cartridge 20 has already accurately been adjusted, and it is possible to suppress the vibration and noise caused during the rotation of the rotor 3.

The present disclosure is not limited to the above-described embodiments, and also includes an embodiment obtained by modifying the above-described embodiments and an embodiment obtained by combining these embodiments as appropriate.

The contents described in some embodiments described above would be understood as follows, for instance.

1) A balance adjustment method (1) for a rotor according to at least one embodiment of the present disclosure is a balance adjustment method for a rotor (3), in which a turbine wheel (5) and a compressor wheel (6) are connected via a rotational shaft (4), that includes an imbalance acquisition step (second imbalance acquisition step S105) of acquiring imbalance position and amount of the above-described rotor (3) after a first balance correction step (Step S104) of correcting balance of the above-described rotor (3) by cutting at least one of the above-described compressor wheel (6) and a nut member (21) connecting the above-described compressor wheel (6) to the above-described rotational shaft (4), an excision target section determination step (second excision target section determination step S106) of determining, based on the imbalance position and amount of the above-described rotor (3) acquired in the above-described imbalance acquisition step (second imbalance acquisition step S105), an excision target range (57) including an imbalance correction position (P1) of the above-described turbine wheel (5) and a removal amount in the above-described excision target range (57), and a second balance correction step (S107) of correcting the balance of the above-described rotor (3) by repeatedly irradiating the above-described excision target range (57) determined in the above-described excision target section determination step (second excision target section determination step S106) with laser light from a laser marker device (8) to remove by the above-described removal amount from the above-described turbine wheel (5).

With the above method 1), the second balance correction step includes correcting the balance of the above-described rotor by repeatedly irradiating the excision target range with the laser light from the laser marker device to remove the imbalance from the turbine wheel by the above-described removal amount. Herein, the above-described laser marker device has a smaller laser light output than a laser processing machine for metal processing, and can reduce the removal amount from the turbine wheel per scan in the excision target range. Thus, accurate removal by a desired removal amount is possible by repeatedly scanning the excision target range. That is, the above-described laser marker device is suitable for finely adjusting the balance of the rotor in the second balance correction step. Further, the above-described laser marker device can accurately process the turbine wheel even if the turbine wheel is made of a difficult-to-cut material. Thus, with the above method, it is possible to improve accuracy in balance adjustment of the rotor. Further, since the above-described laser marker device is cheaper than the laser processing machine for metal processing, it is possible to suppress the increase in equipment cost.

2) In some embodiments, in the balance adjustment method (1) for the rotor according to the above method 1), the above-described excision target range (57) is located on a peripheral surface (551) of a boss portion (55) of the above-described turbine wheel (5).

With the above method 2), the excision target range is located on the peripheral surface of the boss portion of the turbine wheel. In order to remove a part of the turbine wheel as imbalance from the excision target range located on the peripheral surface of the boss portion, the laser light of the laser marker device is emitted along a direction intersecting with (for example, orthogonal to) the axial direction of the turbine wheel. Herein, the boss portion of the turbine wheel has a smaller centrifugal force, which is generated during the rotation of the turbine wheel, than the hub (51) and the blades (53), making it possible to reduce an adverse effect (such as a decrease in high cycle fatigue strength) due to the removal processing in the excision target range.

Then, since the peripheral surface of the boss portion has the longer distance from the rotation center axis (RC) of the boss portion (turbine wheel) than the end surface (552) of the boss portion, it is possible to reduce the removal amount needed to eliminate the imbalance. Further, the end surface of the boss portion is cut off at the time of balance adjustment in the turbine rotor alone, and it may be impossible to secure the sufficient cutting allowance. However, the peripheral surface of the boss portion can secure the sufficient cutting allowance even if the removal amount is large.

3) In some embodiments, the balance adjustment method (1) for the rotor according to the above method 1) or 2), further includes an excision condition determination step (S201) of determining, with reference to at least one piece of unit excision information (UE) where an irradiation frequency (TI) of the above-described laser light and a scan speed (SS) of the above-described laser light of the above-described laser marker device (8) are associated with a unit removal amount (UR) which is a removal amount per unit area, the above-described irradiation frequency (TI) of the above-described laser light and the above-described scan speed (SS) of the above-described laser light in the above-described second balance correction step (S107) from the above-described excision target range (57) and the above-described removal amount determined in the above-described excision target section determination step (second excision target section determination step S106).

With the above method 3), based on the relationship (unit excision information) between the laser light irradiation frequency and the laser light scan speed of the laser marker device, and the unit removal amount which is the removal amount per unit area, the laser light irradiation frequency and the laser light scan speed in the second balance correction step are determined from the excision target range and the removal amount determined in the excision target section determination step. In this case, a difference between the removal amount determined in the excision target section determination step and an actual amount removed in the second balance correction step can be reduced, making it possible to remove the imbalance of an appropriate amount from the turbine wheel (5). Thus, with the above method, it is possible to improve accuracy in balance adjustment of the rotor (3).

4) In some embodiments, in the balance adjustment method (1) for the rotor according to the above method 3), the above-described at least one piece of unit excision information (UE) includes a plurality of pieces of unit excision information (UE) each having the above-described different scan speed (SS) with respect to the above-described same unit removal amount, and the above-described excision condition determination step (S201) includes determining, as the above-described irradiation frequency (TI) and the above-described scan speed (SS) in the above-described second balance correction step, an irradiation frequency (TI) and a scan speed (SS) of unit excision information (UE) with the above-described highest scan speed (SS) among the above-described plurality of pieces of unit excision information (UE).

Although the imbalance removal amount per irradiation frequency is decreased if the laser light scan speed is increased, and it is possible to reduce a difference between the expected removal amount and the actual removal amount of the imbalance. That is, it is possible to improve imbalance removal accuracy. By contrast, if the laser light scan speed is decreased, although the difference between the expected removal amount and the actual removal amount of the imbalance is increased as compared with the case where the scan speed is high, it is possible to increase the imbalance removal amount per irradiation frequency. With the above method 4), since the excision condition determination step includes determining, as the irradiation frequency and the scan speed in the second balance correction step, the irradiation frequency and the scan speed of the unit excision information with the highest scan speed among the plurality of pieces of unit excision information, it is possible to improve imbalance removal accuracy.

5) In some embodiments, in the balance adjustment method (1) for the rotor according to the above method 4), each scan speed (SS) of the above-described plurality of pieces of unit excision information (UE) is less than an upper threshold (USS).

If the laser light scan speed is increased, it is possible to improve imbalance removal accuracy as compared with the case where the scan speed is low. However, if the scan speed is increased, the imbalance removal amount per irradiation frequency (scan) is reduced, increasing the irradiation frequency and increasing the cycle time in the second balance correction step. The "cycle time" means a time required for the laser marker device 8 to remove the imbalance from the turbine wheel 5 by the amount necessary for balance adjustment, in the second balance correction step. For example, in a manufacturing process of the turbocharger including the rotor, if the cycle time in the second balance correction step is longer than that in other processes, the productivity of the turbocharger decreases. With the above method 5), since the irradiation frequency and the scan speed of the unit excision information with the highest scan speed among the plurality of pieces of unit excision information including the scan speed less than the upper threshold are determined as the irradiation frequency and the scan speed in the second balance correction step, it is possible to make the scan speed in the second balance correction step less than the upper threshold. Thus, it is possible to prevent the cycle time in the second balance correction step from becoming too long, while improving imbalance removal accuracy.

6) In some embodiments, in the balance adjustment method (1) for the rotor according to the above method 3), the above-described at least one piece of unit excision information (UE) includes a plurality of pieces of unit excision information (UE) each having the above-described different scan speed (SS) with respect to the above-described same unit removal amount (UR), and the above-described excision condition determination step (S201) includes determining, as the above-described irradiation frequency (TI) and the above-described scan speed (SS) in the above-described second balance correction step, an irradiation frequency (TI) and a scan speed (SS) of unit excision information (UE) with a minimum cycle time in the above-described second balance correction step (S107) among the above-described plurality of pieces of unit excision information (UE).

With the above method 6), since the excision condition determination step includes determining, as the irradiation frequency and the scan speed in the second balance correction step, the irradiation frequency and the scan speed of the unit excision information with the minimum cycle time in the second balance correction step among the plurality of pieces of unit excision information, it is possible to shorten the cycle time in the second balance correction step.

7) In some embodiments, in the balance adjustment method (1) for the rotor according to the above method 6), each scan speed (SS) of the above-described plurality of pieces of unit excision information (UE) is greater than a lower threshold (LSS).

If the lager light scan speed is decreased, the imbalance removal amount per irradiation frequency (scan) is increased as compared with the case where the scan speed is high, making it possible to decrease the irradiation frequency and to shorten the cycle time in the second balance correction step. However, if the scan speed is decreased, the difference between the expected removal amount and the actual removal amount of the imbalance is increased, decreasing imbalance removal accuracy. With the above method 7), since the irradiation frequency and the scan speed of the unit excision information with the minimum cycle time among the plurality of pieces of unit excision information including the scan speed greater than the lower threshold are determined as the irradiation frequency and the scan speed in the second balance correction step, it is possible to make the scan speed in the second balance correction step greater than the lower threshold. Thus, it is possible to secure necessary imbalance removal accuracy while shortening the cycle time in the second balance correction step.

8) In some embodiments, in the balance adjustment method (1) for the rotor according to the above method 3), the above-described at least one piece of unit excision information (UE) includes a plurality of pieces of unit excision information (UE) each having the above-described different scan speed (SS), and the above-described excision condition determination step (S201) includes determining, as the above-described irradiation frequency (TI) and the above-described scan speed (SS) in the above-described second balance correction step, an irradiation frequency (TI) and a scan speed (SS) of each of first unit excision information (UE6) including a first scan speed (SS6) as the above-described scan speed (SS) and second unit excision information (UE7) including a second scan speed (SS7) higher than the above-described first scan speed (SS6) as the above-described scan speed (SS), from among the above-described plurality of pieces of unit excision information (UE).

With the above method 8), since the excision condition determination step includes determining the irradiation frequency and the scan speed of each of the two pieces of unit excision information (the first unit excision information UE6, the second unit excision information UE7) different from each other in scan speed as the irradiation frequency and the scan speed in the second balance correction step, it is possible to change the laser light scan speed in the second balance correction step (S107). Thus, the imbalance can quickly be removed with the first scan speed lower than the second scan speed as the laser light scan speed, making it possible to suppress the increase in cycle time. Further, with the second scan speed higher than the first scan speed as the laser light scan speed, it is possible to secure imbalance removal accuracy.

9) In some embodiments, in the balance adjustment method (1) for the rotor according to the above method 8), the above-described second balance correction step (S107) includes a former half correction step (low-speed correction step S107A) in which the above-described scan speed (SS) of the above-described laser light is the above-described first scan speed (SS1), and a latter half correction step (high-speed correction step S107B) performed after the above-described former half correction step (low-speed correction step S107A), in which the above-described scan speed (SS) of the above-described laser light is the above-described second scan speed (SS7) higher than the above-described first scan speed (SS6).

With the above method 9), since the balance correction in the second balance correction step has the relationship between the laser light irradiation frequency (TI) and the laser light scan speed of the laser marker device (8), and the unit removal amount (UR) serving as the removal amount per unit area, which is weakened as the cutting depth increases, it is possible to suppress the decrease in imbalance removal accuracy by scanning with the laser light at the second scan speed higher than the first scan speed in the latter half correction step.

10) In some embodiments, in the balance adjustment method (1) for the rotor according to any one of the above methods 1) to 9), the above-described excision target range (57) is located on a peripheral surface (551) of a boss portion (55) of the above-described turbine wheel (5), as well as has a long axis (LA) along a circumferential direction of the above-described turbine wheel (5) and has a short axis (SA) along an axial direction of the above-described turbine wheel (5).

With the above method 10), the excision target range has the long axis along the circumferential direction of the turbine wheel, and has the short axis along the axial direction of the turbine wheel. Since the peripheral surface (551) of the boss portion (55) of the turbine wheel has the circumferential length longer than the axial length, the excision target range having the long axis along the circumferential direction easily secures its range.

11) In some embodiments, in the balance adjustment method (1) for the rotor according to the above method 10), a condition of 1.5≤L2/L1≤100 is satisfied, where L1 is a length of the above-described short axis (SA) and L2 is a length of the above-described long axis (LA).

If the length L2 of the long axis of the excision target range (57) is too long, distances from the imbalance correction position (P1) to both end portions (571, 572) of the long axis extending along the circumferential direction of the turbine wheel 5 increase, which may make the both end portions (571, 572) less effective in correcting imbalance. Further, if the length L2 of the long axis of the excision target range is too short, it may be impossible to remove by the removal amount needed to eliminate the imbalance. With the above method 11), since the condition of 1.5≤L2/L1≤100 is satisfied, it is possible to suppress the increase in distances from the imbalance correction position to the both end portions of the long axis, and to make the both end portions effective in correcting the imbalance over the entire excision target range. Further, it is possible to secure the removal amount needed to eliminate the imbalance.

12) In some embodiments, in the balance adjustment method (1) for the rotor according to the above method 10) or 11), the above-described excision target range (57) includes a first excision target range (57A) and a second excision target range (57B) disposed alongside the above-described first excision target range (57A) in the above-described axial direction of the above-described turbine wheel (5).

With the above method 12), since each of the plurality of excision target ranges (such as the first excision target range 57A, the second excision target range 57B) has the short axis (SA) along the axial direction of the turbine wheel, the plurality of excision target ranges (57) can be located on the peripheral surface (551) of the boss portion (55) of the turbine wheel. Further, since the plurality of excision target ranges are located on the peripheral surface of the boss portion of the turbine wheel alongside each other in the axial direction of the turbine wheel, compared with a case where the single excision target range (57) is located, it is possible to increase the amount removable from the boss portion of the turbine wheel while suppressing an excessive increase in the long axis (LA) of each excision target range.

13) In some embodiments, in the balance adjustment method (1) for the rotor according to any one of the above methods 1) to 12), the above-described laser light of the above-described laser marker device (8) has a maximum output of not greater than 100 W.

With the above method 13), since the laser marker device has the maximum output of laser light which is not greater than 100 W, it is possible to reduce the removal amount from the turbine wheel (5) per scan, making accurate removal by the desired removal amount possible by repeatedly scanning the excision target range (57). Further, since the laser marker device whose maximum output of laser light is not greater than 100 W is cheaper than a laser marker device whose maximum output of laser light exceeds 100 W, it is possible to suppress the increase in equipment cost.

14) A turbocharger (2) according to at least one embodiment of the present disclosure is a turbocharger (2) including a rotor (3) in which a turbine wheel (5) and a compressor wheel (6) are connected via a rotational shaft (4). The above-described turbine wheel (5) has a laser mark (58) engraved on a peripheral surface (551) of a boss portion (55) by a laser marker device (8).

With the above configuration 14), since the turbocharger has the laser mark engraved on the peripheral surface of the boss portion of the turbine wheel by the laser marker device, the balance of the above-described rotor has already been adjusted, and it is possible to suppress the vibration and noise caused during the rotation of the rotor.

For example, it is possible to accurately remove the imbalance by repeatedly irradiating the peripheral surface of the boss portion of the turbine wheel with laser light from the laser marker device, making it possible to improve accuracy in balance adjustment of the rotor. Further, since the above-described laser marker device is cheaper than the laser processing machine for metal processing, it is possible to suppress the increase in equipment cost.

REFERENCE SIGNS LIST

1 Balance adjustment method
2 Turbocharger
20 Cartridge
21 Nut member
22 Bearing
23 Bearing housing
24 Turbine housing
25 Compressor housing
26 Compressor-side cut mark
3 Rotor
4 Rotational shaft
41 One end portion
42 Another end portion
43, 45 Outer peripheral surface
44 Protruding portion
5 Turbine wheel
50 Turbine rotor
51 Hub
52 Outer peripheral surface
53 Blade
54 One end portion
55 Boss portion
57 Excision target range
57A First excision target range
57B Second excision target range
58 Laser mark
59 Cut mark
6 Compressor wheel
61 Hub
62 Outer peripheral surface
63 Blade
64 Through hole
65 Leading edge end
7 Imbalance detection device
71 Housing member
71A Turbine-side housing member
71B Compressor-side housing member
72 Support mechanism
72A Turbine-side support mechanism
72B Compressor-side support mechanism
73 Vibration isolation member
74 Pressing device
75 Rotating device
751 Blower
752 Air supply pipe
76 Detection device
761 Acceleration sensor
762 Rotation angle sensor
763 Computing device
8 Laser marker device
81 Laser light irradiation part
82 Irradiation position adjustment part
L Axis
LA Long axis
P1 Imbalance correction position
RC Rotation center axis
RG Reference vibration acceleration
RT Unit excision period information
S101 Cartridge assembly step
S102 First imbalance acquisition step
S103 First excision target section determination step
S104 First balance correction step
S105 Second imbalance acquisition step
S106 Second excision target section determination step
S107A Low-speed correction step
S107B High-speed correction step
S107 Second balance correction step
S201 Excision condition determination step
SA Short axis
SS, SS1-SS7 Scan speed
T Trajectory
TI, TI1-TI5 Irradiation frequency
TP Laser irradiation target position
UE, UE1-UE7 Unit excision information
UR, UR1 Unit removal amount
UT, UT1-UT5 Unit excision period

The invention claimed is:

1. A balance adjustment method for a rotor in which a turbine wheel and a compressor wheel are connected via a rotational shaft, comprising:

an imbalance acquisition step of acquiring imbalance position and amount of the rotor after a first balance correction step of correcting balance of the rotor by cutting at least one of the compressor wheel and a nut member connecting the compressor wheel to the rotational shaft;

an excision target section determination step of determining, based on the imbalance position and amount of the rotor acquired in the imbalance acquisition step, an excision target range including an imbalance correction position of the turbine wheel and a removal amount in the excision target range;

a second balance correction step of correcting the balance of the rotor by repeatedly irradiating the excision target range determined in the excision target section determination step with laser light from a laser marker device to remove by the removal amount from the turbine wheel; and an excision condition determination step of determining, with reference to at least one piece of unit excision information where an irradiation frequency of the laser light and a scan speed of the laser light of the laser marker device are associated with a unit removal amount which is a removal amount per unit area, the irradiation frequency of the laser light and the scan speed of the laser light in the second balance correction step from the excision target range and the removal amount determined in the excision target section determination step, wherein the at least one piece of unit excision information includes a plurality of pieces of unit excision information each having the different scan speed with respect to the same unit removal amount, and wherein the excision condition determination step includes determining, as the irradiation frequency and the scan speed in the second balance correction step, an irradiation frequency and a scan speed of unit excision information with the highest scan speed among the plurality of pieces of unit excision information.

2. The balance adjustment method for the rotor according to claim 1,
wherein the excision target range is located on a peripheral surface of a boss portion of the turbine wheel.

3. The balance adjustment method for the rotor according to claim 1,
wherein each scan speed of the plurality of pieces of unit excision information is less than an upper threshold.

4. A balance adjustment method for a rotor in which a turbine wheel and a compressor wheel are connected via a rotational shaft, comprising:

an imbalance acquisition step of acquiring imbalance position and amount of the rotor after a first balance correction step of correcting balance of the rotor by cutting at least one of the compressor wheel and a nut member connecting the compressor wheel to the rotational shaft;

an excision target section determination step of determining, based on the imbalance position and amount of the rotor acquired in the imbalance acquisition step, an excision target range including an imbalance correction position of the turbine wheel and a removal amount in the excision target range;

a second balance correction step of correcting the balance of the rotor by repeatedly irradiating the excision target range determined in the excision target section determination step with laser light from a laser marker device to remove by the removal amount from the turbine wheel; and an excision condition determination step of determining, with reference to at least one piece of unit excision information where an irradiation frequency of the laser light and a scan speed of the laser light of the laser marker device are associated with a unit removal amount which is a removal amount per unit area, the irradiation frequency of the laser light and the scan speed of the laser light in the second balance correction step from the excision target range and the removal amount determined in the excision target section determination step, wherein the at least one piece of unit excision information includes a plurality of pieces of unit excision information each having the different scan speed with respect to the same unit removal amount, and wherein the excision condition determination step includes determining, as the irradiation frequency and the scan speed in the second balance correction step, an irradiation frequency and a scan speed of unit excision information with a minimum cycle time in the second balance correction step among the plurality of pieces of unit excision information.

5. The balance adjustment method for the rotor according to claim 4,
wherein each scan speed of the plurality of pieces of unit excision information is greater than a lower threshold.

6. A balance adjustment method for a rotor in which a turbine wheel and a compressor wheel are connected via a rotational shaft, comprising:

an imbalance acquisition step of acquiring imbalance position and amount of the rotor after a first balance correction step of correcting balance of the rotor by cutting at least one of the compressor wheel and a nut member connecting the compressor wheel to the rotational shaft;

an excision target section determination step of determining, based on the imbalance position and amount of the rotor acquired in the imbalance acquisition step, an excision target range including an imbalance correction position of the turbine wheel and a removal amount in the excision target range;

a second balance correction step of correcting the balance of the rotor by repeatedly irradiating the excision target range determined in the excision target section determination step with laser light from a laser marker device to remove by the removal amount from the turbine wheel; and an excision condition determination step of determining, with reference to at least one piece of unit excision information where an irradiation frequency of the laser light and a scan speed of the laser light of the laser marker device are associated with a unit removal amount which is a removal amount per unit area, the irradiation frequency of the laser light and the scan speed of the laser light in the second balance correction step from the excision target range and the removal amount determined in the excision target section determination step, wherein the at least one piece of unit excision information includes a plurality of pieces of unit excision information each having the different scan speed, and wherein the excision condition determination step includes determining, as the irradiation frequency and the scan speed in the second balance correction step, an irradiation frequency and a scan speed of each of first unit excision information including a first scan speed as the scan speed and second unit excision information including a second scan speed higher than the first scan speed as the scan speed, from among the plurality of pieces of unit excision information.

7. The balance adjustment method for the rotor according to claim 6,
wherein the second balance correction step includes:
a former half correction step in which the scan speed of the laser light is the first scan speed; and a latter half correction step performed after the former half correction step, in which the scan speed of the laser light is the second scan speed higher than the first scan speed.

8. The balance adjustment method for the rotor according to claim 1,
wherein the excision target range is located on a peripheral surface of a boss portion of the turbine wheel, as well as has a long axis along a circumferential direction of the turbine wheel and has a short axis along an axial direction of the turbine wheel.

9. The balance adjustment method for the rotor according to claim 8,
wherein a condition of $1.5 \leq L2/L1 \leq 100$ is satisfied, where L1 is a length of the short axis and L2 is a length of the long axis.

10. The balance adjustment method for the rotor according to claim 8,
wherein the excision target range includes a first excision target range and a second excision target range disposed alongside the first excision target range in the axial direction of the turbine wheel.

11. The balance adjustment method for the rotor according to claim 1,
wherein the laser light of the laser marker device has an output of not greater than 100 W.

12. The balance adjustment method for the rotor according to claim 4,
wherein the excision target range is located on a peripheral surface of a boss portion of the turbine wheel.

13. The balance adjustment method for the rotor according to claim 4,
wherein the excision target range is located on a peripheral surface of a boss portion of the turbine wheel, as well as has a long axis along a circumferential direction of the turbine wheel and has a short axis along an axial direction of the turbine wheel.

14. The balance adjustment method for the rotor according to claim 13,
wherein a condition of $1.5 \leq 1L2/L1 \leq 100$ is satisfied, where L1 is a length of the short axis and L2 is a length of the long axis.

15. The balance adjustment method for the rotor according to claim 13,
wherein the excision target range includes a first excision target range and a second excision target range disposed alongside the first excision target range in the axial direction of the turbine wheel.

16. The balance adjustment method for the rotor according to claim 4,
wherein the laser light of the laser marker device has an output of not greater than 100 W.

17. The balance adjustment method for the rotor according to claim 6,
wherein the excision target range is located on a peripheral surface of a boss portion of the turbine wheel.

18. The balance adjustment method for the rotor according to claim 6,
wherein the excision target range is located on a peripheral surface of a boss portion of the turbine wheel, as well as has a long axis along a circumferential direction of the turbine wheel and has a short axis along an axial direction of the turbine wheel.

19. The balance adjustment method for the rotor according to claim 18,
wherein a condition of $1.5 \leq L2/L1 \leq 100$ is satisfied, where L1 is a length of the short axis and L2 is a length of the long axis.

20. The balance adjustment method for the rotor according to claim 18,
wherein the excision target range includes a first excision target range and a second excision target range disposed alongside the first excision target range in the axial direction of the turbine wheel.

* * * * *